US005138335A

United States Patent [19]

Sugimoto et al.

[11] Patent Number: 5,138,335

[45] Date of Patent: Aug. 11, 1992

[54] THERMAL PRINTER WITH REMOVABLE RIBBON UNIT

[75] Inventors: Kazuaki Sugimoto, Numazu; Satoshi Kitahara; Akio Yamamoto, both of Mishima; Ikuzo Sugiura, Sagamihara, all of Japan

[73] Assignee: Tokyo Electric Co., Ltd., Tokyo, Japan

[21] Appl. No.: 596,093

[22] Filed: Oct. 11, 1990

[30] Foreign Application Priority Data

Oct. 16, 1989 [JP] Japan .................................. 1-268549
Oct. 16, 1989 [JP] Japan .................................. 1-268553

[51] Int. Cl.[5] .............................................. G01D 15/10
[52] U.S. Cl. .............................. 346/76 PH; 400/219; 400/235; 400/236; 400/242; 400/692
[58] Field of Search .................... 346/76 PH; 400/219, 400/236, 242, 246, 692, 235, 235.1

[56] References Cited

U.S. PATENT DOCUMENTS 4,908,632 3/1990 Ishikawa et al. ............... 346/76 PH
4,944,619 7/1990 Suzuki et al. .................... 400/224.2

FOREIGN PATENT DOCUMENTS 59-212287 12/1984 Japan .
0158278 7/1988 Japan .................................. 400/246
2-116584 5/1990 Japan .

*Primary Examiner*—Benjamin R. Fuller
*Assistant Examiner*—Nancy Le
*Attorney, Agent, or Firm*—Frishauf, Holtz, Goodman & Woodward

[57] ABSTRACT

A thermal printer includes a ribbon supply device for running a transfer ribbon through a printing section. The device includes a ribbon unit and a ribbon drive section which are removably mounted on a head supporting frame of the printing section. The ribbon unit includes a supply shaft on which the ribbon is wound, a take-up shaft for take-up the ribbon drawn from the supply shaft, a tension shaft, and a ribbon drive shaft. The supply and tension shafts are arranged to be symmetrical to the take-up and ribbon drive shafts, respectively, about an imaginary plane which extends between the supply shaft and the take-up shaft and between the tension shaft and the ribbon drive shaft, in parallel with these shafts, so that the unit is capable of being remounted on the head supporting frame while the unit is turned through 180 degrees.

17 Claims, 15 Drawing Sheets

THERMAL PRINTER WITH REMOVABLE RIBBON UNIT

BACKGROUND OF THE INVENTION

1. Field of the Invention

The present invention relates to a thermal printer for printing information on a recording medium such as a label sheet with a thermal head by leading the medium between a platen and the thermal head.

2. Description of the Related Art

A label printer for printing product names or bar codes on labels, for example, comprises a printing section having a platen roller and a line thermal head, and a paper-feeding mechanism for feeding labels to the printing section.

Upon the printing using the line thermal head, a direct-thermal printing or a heat-transfer thermal printing system has been used so far. With the direct-thermal printing, selected portions of a label composed of heat-sensitive paper are directly heated by the line thermal head, thereby to form characters on the label. With the heat-transfer thermal printing, however, selected portions of a transfer ribbon, which put on a label, are heated by the thermal head, thereby to transfer ink of the ribbon onto the label.

Therefore, for performing the transfer-type printing, the printer requires a ribbon supply device having the shafts for supplying and taking up the transfer ribbon, in addition to the printing section and the paper-feeding mechanism.

However, in conventional label printers, the ribbon supply device for the transfer-type printing is integrated with the printer body as a part of the printer. Thus, it is difficult to remove only the ribbon supply device from the printer body in view of the configuration thereof.

Therefore, an expensive ribbon supply device is always attached to the printer body even when the direct-thermal printing system, requiring no transfer ribbon, is used, so that the printer becomes expensive and cannot adequately show the advantage of the direct-thermal printing, which does not require the use of a transfer ribbon.

Generally, the ribbon supply device has a ribbon guide shaft arranged on the rear side of the printing section, a transfer-ribbon take-up shaft, and a transfer-ribbon supply shaft. When the take-up shaft is rotated by a motor, it directly takes up the transfer ribbon passed through the printing section and draws the transfer ribbon from the supply shaft. The supply shaft is connected to a load-adjusting mechanism which brakes the supply shaft so as to apply back tension to the transfer ribbon.

Though the motor torque directly applied to the take-up shaft is constant, the winding force acting on the transfer ribbon depends on the diameter of the roll of the transfer ribbon wound on the take-up shaft. Specifically, the winding force increases as the diameter of the ribbon roll decreases and vice versa. By the variation in the winding force, the transfer ribbon is not taken up with a constant force. Therefore, the ribbon is firmly wound on the shaft at the beginning of taking up but it is loosely wound at the end of the taking-up. However, to reuse the once-used transfer ribbon which has unevenly wound up, the ribbon tends to run unstably. Therefore, there is the problem that the once-used transfer ribbon unevenly wound up cannot be reused.

Moreover, at the beginning of the taking-up of the ribbon where a large winding force is applied, disconnection of the ribbon or smudge (phenomenon in which a paper sheet is smudged because the ink layer is peeled from the base film of the ribbon due to excessive tension of the transfer ribbon and attached on the paper sheet) easily occurs. On the contrary, at the end of the taking-up of the ribbon where a small winding force is applied, sticking (phenomenon in which the transfer ribbon moves at speed lower than a set speed, causing faulty transfer) easily occurs. Therefore, there is also the problem that printing quality is impaired due to these troubles.

SUMMARY OF THE INVENTION

The present invention is contrived in consideration of the above circumstances, and its object is to provide a thermal printer capable of effectively operating a ribbon supply device, decreasing the manufacturing cost, and improving the printing quality.

In order to achieve the above object, the thermal printer according to the invention comprises: printing means having a thermal head and a platen pressed against the thermal head, for printing information on a recording medium passing between the platen and the thermal head; feeding means for feeding the recording medium by passing it between the platen and the thermal head; and a ribbon supply device for running a transfer ribbon passing through between the thermal head and the recording medium. The ribbon supply device includes a ribbon unit and a drive section for driving the ribbon unit. The ribbon unit has a ribbon supporting frame, a first rotary shaft which is rotatably supported by the supporting frame and on which the transfer ribbon is wound, and a second rotary shaft for taking-up the transfer ribbon drawn from the first rotary shaft and passed between the thermal head and the recording medium. The first and second rotary shafts have the same shape and size so that these shafts can be removed from the ribbon supporting frame and can be remounted thereon, switched in position. The drive section rotates the second rotary shaft and takes-up the transfer ribbon, which is drawn from the first rotary shaft and passed between the thermal head and the platen, on the second rotary shaft.

According to the printer having the above-mentioned construction, the first and second rotary shafts have the same structure and can be set to the ribbon supporting frame while being replaced their positions each other. Each rotary shaft functions as a supply shaft when it is set at the rear side of the ribbon supporting frame and as a take-up shaft when it is set at the front side of the frame, that is, when it is set at the position adjacent to the thermal head. Therefore, if the first and second rotary shafts, along with the transfer ribbon, are set on the supporting frame while being replaced their positions each other, the used transfer ribbon can be reused without rewinding it on the supply shaft.

According to the thermal printer of the present invention, the ribbon unit and drive section of the ribbon supply device are detachably mounted on a head frame supporting the thermal head. Therefore, for the direct-thermal printing free from the transfer ribbon, the ribbon supply device can be detached from the head frame. Thus, it is unnecessary to normally mount the expensive ribbon supply device on the printer, so that the printer and the ribbon supply device can be effectively used.

Further, according to the present invention, the ribbon unit includes a ribbon drive shaft which is rotatably supported by the ribbon supporting frame and located between the printing means and the second rotary shaft so as to contact the transfer ribbon between them. The drive section includes a drive shaft for rotating the second rotary shaft, and a clutch system arranged between this drive shaft and the second rotary shaft, for disconnecting transmission of the torque from the drive shaft to the second rotary shaft when the force larger than the friction force between the ribbon drive shaft and the transfer ribbon acts on the second rotary shaft.

Before the transfer ribbon drawn from the first rotary shaft or the supply shaft and passing through the printing means is taken-up on the second rotary shaft or the take-up shaft, the ribbon drive shaft contacts the transfer ribbon to transfer it toward the take-up shaft. The transfer ribbon is moved by the friction force between the ribbon drive shaft and the ribbon. In this case, the ribbon moving force does not greatly vary unlike the case in which the transfer ribbon is directly taken-up by the take-up shaft without using the ribbon drive shaft. The take-up shaft winds-up the transfer ribbon passed through the ribbon drive shaft.

While the transfer ribbon is being wound-up on the take-up shaft, the clutch is tuned "off" state to disconnect transmission of the torque from the drive section to the take-up shaft, when the force acting on the take-up shaft becomes larger than the friction force between the ribbon drive shaft and the transfer ribbon in accordance with change in the diameter of the roll of the wound-up ribbon. Therefore, it is possible to prevent variation of the winding force due to change in the diameter of the ribbon roll on the take-up shaft from directly influencing the transfer ribbon passing through the printing section. Thus, the transfer ribbon can be wound-up while the moving force acting on the ribbon between the printing means and the ribbon drive shaft is kept constant. In this manner, the transfer ribbon is wound-up with a substantially constant winding force, so that it is possible to prevent the transfer ribbon from being firmly or loosely wound-up.

Therefore, the once-used transfer ribbon can be re-used by inversely remounting the first rotary shaft, from which the transfer ribbon is completely drawn out, and the second rotary shaft, on which it is completely taken-up with a substantially constant winding force, on the ribbon supporting frame.

In order to achieve the same object, according to the thermal printer of the present invention, the ribbon unit has a tension shaft in addition to the first and second rotary shafts and the ribbon drive shaft. This tension shaft is rotatably supported by the ribbon supporting frame and arranged so as to contact the transfer ribbon between the first rotary shaft and the printing means. The first and second rotary shafts have the same shape and size, and are arranged so that they will be symmetric to an imaginary plane passing through the longitudinal center of the ribbon unit. The tension and ribbon drive shafts also have the same shape and size, and are arranged so that they will be symmetric to the imaginary plane.

Therefore, after detaching the ribbon unit from the head frame, the unit can be remounted on the head frame and connected to the ribbon drive section by turning the unit through 180 degrees about an imaginary axis located in the imaginary plane and extending in the direction perpendicular to each shaft. By positioning the ribbon unit, back to front, in the above manner, the first rotary shaft, from which the transfer ribbon is completely drawn, and the second rotary shaft, on which the ribbon is wound with a substantially constant winding force, can be used as a take-up shaft and a supply shaft, respectively. The tension shaft and ribbon drive shaft can be used as a ribbon drive shaft and a tension shaft, respectively. Therefore, the once-used transfer ribbon can easily be reused. .

Moreover, according to the present invention, the ribbon drive section comprises a first loading mechanism connected to the first rotary shaft to provide the first rotary shaft with rotational resistance, a second loading mechanism connected to the tension shaft to provide the tension shaft with rotational resistance larger than that of the first loading mechanism, and a clutch mechanism arranged between the second rotary shaft and the drive shaft for rotating it and the second rotary shaft, for disconnecting transmission of the torque from the drive shaft to the second rotary shaft when the force larger than the friction force between the ribbon drive shaft and the transfer ribbon is applied to the second rotary shaft.

The first loading mechanism applies a certain resistance to one rotary shaft serving as the supply shaft, thereby braking the shaft. Similarly, the second loading mechanism applies a certain resistance to the other rotary shaft serving as the tension shaft, thereby braking the shaft. Thus, back tension is given to the transfer ribbon through braking of these shafts. The second loading mechanism provides the braking force larger than that of the first loading mechanism. The relationship between the transfer ribbon and the tension shaft applied with the braking force by the second loading system is always kept constant unlike the relationship between the supply shaft and the ribbon, in which the diameter of the roll of the ribbon wound around the supply shaft varies. Therefore, variation of the back tension due to change in the diameter of the ribbon roll on the supply shaft does not directly influence the transfer ribbon passing through the printing means. As a result, the back tension acting on the transfer ribbon between the printing means and the tension shaft can be kept constant, and the ribbon can be wound-up around the supply shaft by a substantially constant winding force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 through 18 show a thermal printer according to an embodiment of this invention; in which FIG. 1 is a perspective view showing the outline of the printer;

FIG. 1 is a front view of the printer while a case is removed;

FIG. 3 is a sectional view taken along line III—III in FIG. 2;

FIG. 4 is a sectional view taken along line IV—IV in FIG. 2;

FIG. 5 is an enlarged perspective view showing a thermal head and a platen unit;

FIG. 6 is a perspective view of a head frame;

FIG. 7 is a sectional view taken along line VII—VII in FIG. 2;

FIG. 8 is a sectional view taken along line VIII—VIII in FIG. 2;

FIG. 9 is a plane view of a ribbon supply device;

FIG. 10 is a front view of a ribbon unit;

FIG. 11 is a side view of the ribbon unit;

FIG. 12 is an enlarged front view of a shaft end;

FIG. 13 is a side view schematically showing a ribbon drive section connected to a paper-feeding mechanism;

FIG. 14 is a front view showing the ribbon drive section connected to the paper-feeding mechanism;

FIG. 15 is a side view of a power transmitting section;

FIG. 16 is a front view of the power transmitting section;

FIG. 17 is a partially cut away side view showing a separation mechanism; and

FIG. 18 is a plane view of the ribbon supply device while the ribbon unit is reversed and connected to the ribbon drive section.

DETAILED DESCRIPTION OF THE PREFERRED EMBODIMENT

A thermal printer used as a label printer, according to an embodiment of the present invention, will now be described in detail with reference to the accompanying drawings.

Figure 1:
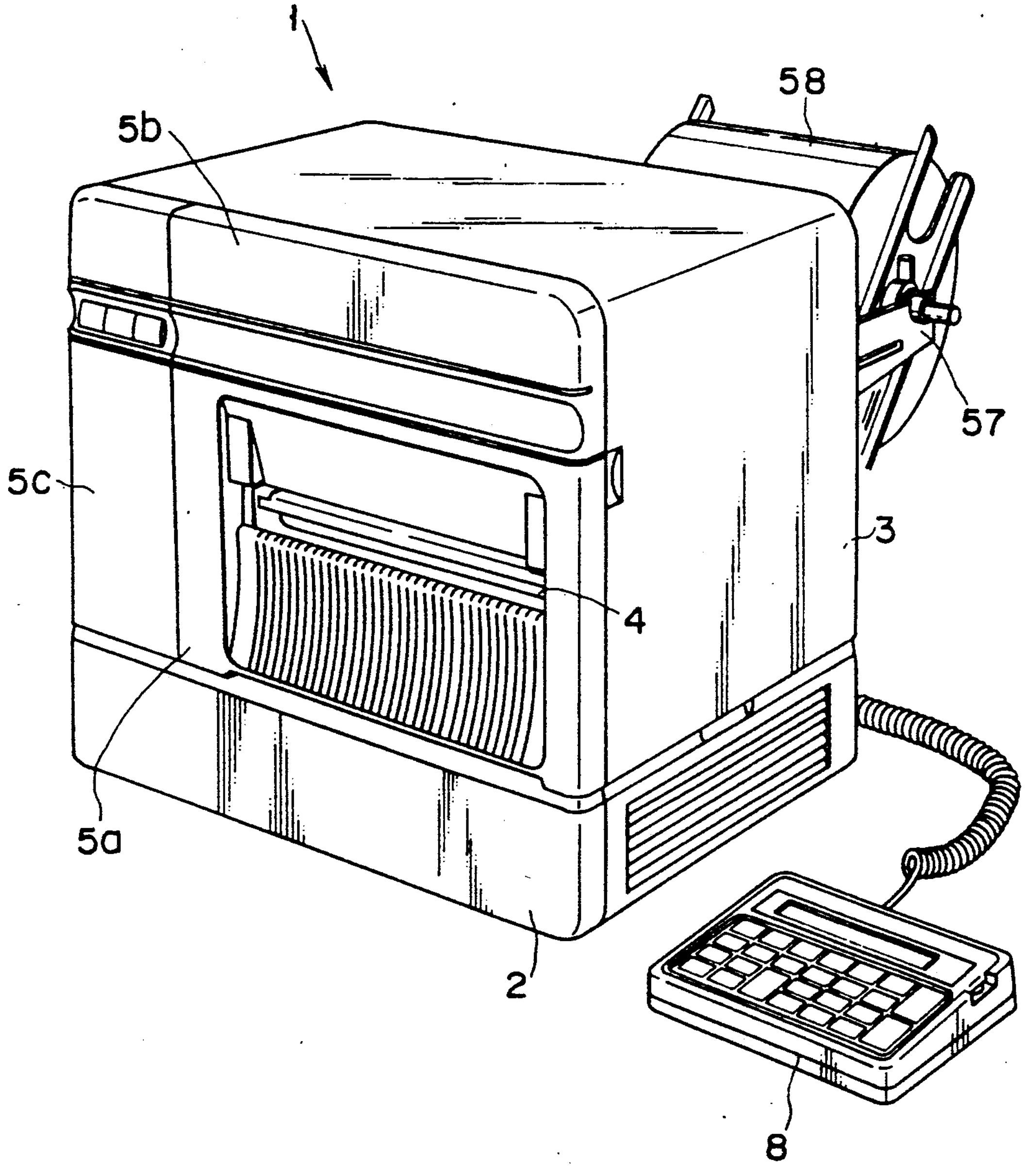
Figure 2:
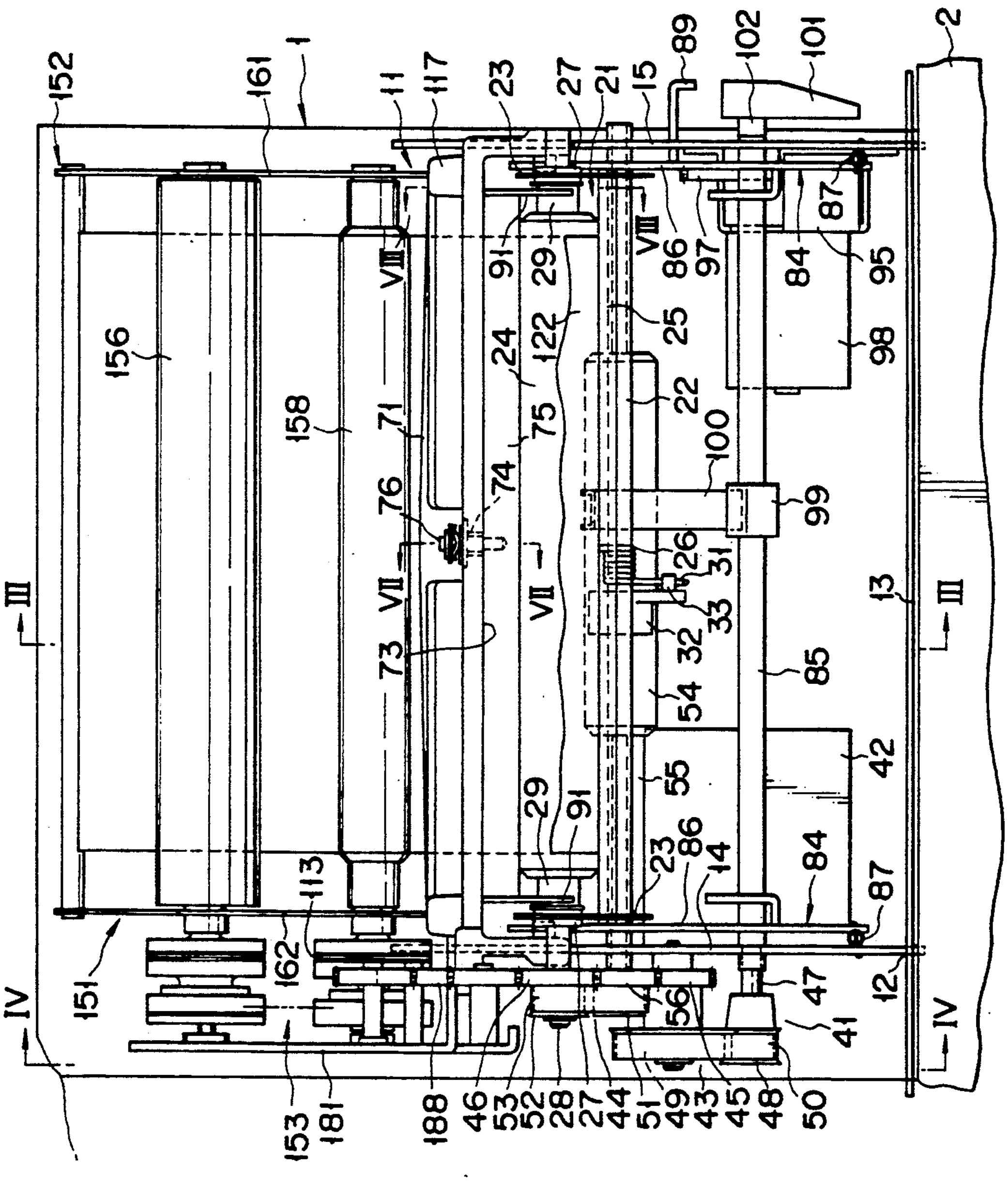
Figure 3:
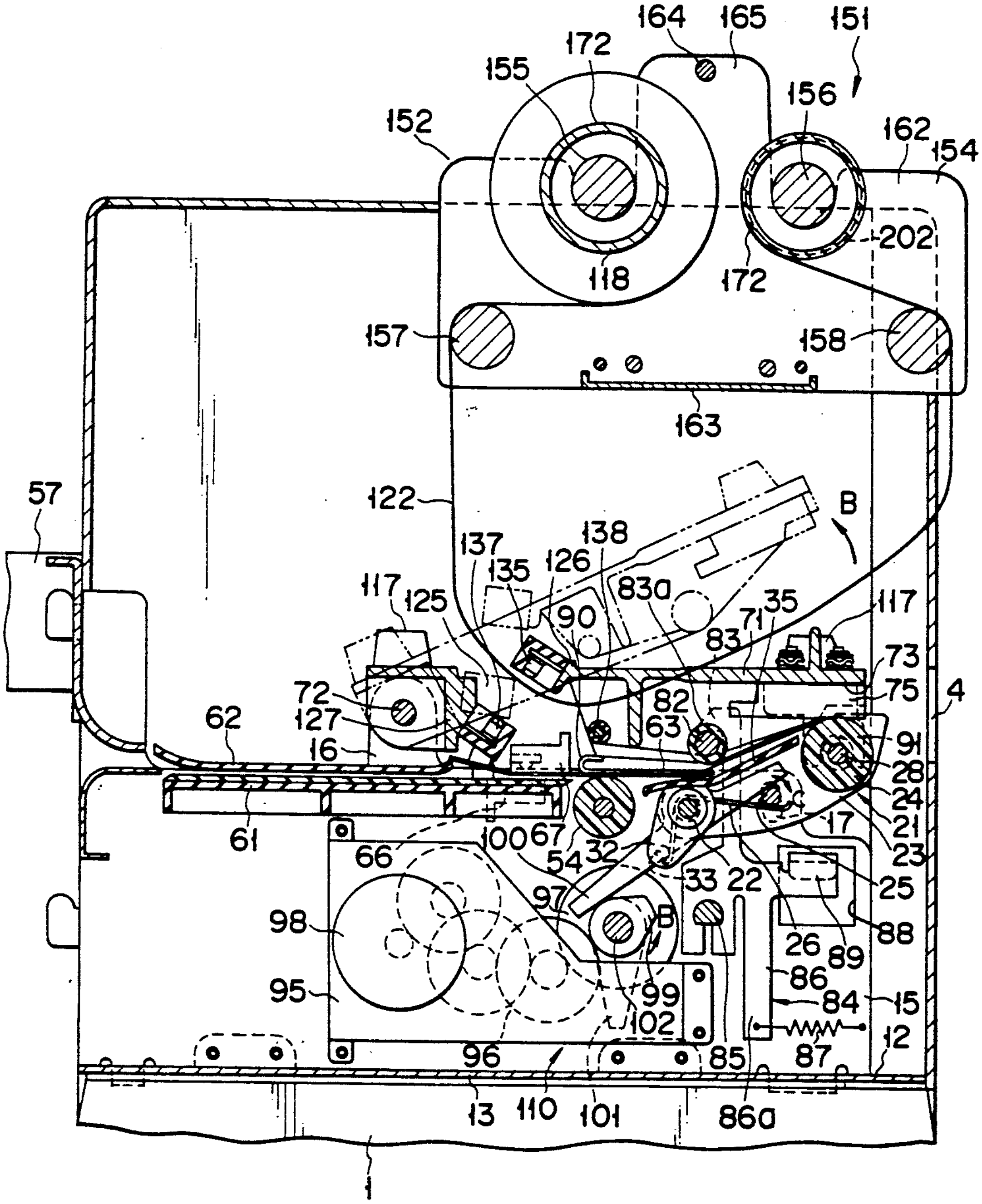

As is shown in FIGS. 1 to 3, the thermal printer comprises a case 1. The case 1 is comprised of a rectangular base 2, a side panel 3, a first front panel 5*a*, a second front panel 5*b*, and a third front panel 5*c*. The side panel 3 is removably mounded on the base 2. It consists of a pair of side walls and a top wall connected to the upper ends of the side walls, and thus has an U-shaped cross section. The first front panel 5*a* has an L-shaped cross section and has an elongated opening 4 though which sheets of paper can pass. The second front panel 5*b* is integrally formed with the side panel 3 and contacts the upper side of the first front panel 5*a*. The third front panel 5*c* is secured to the base 2 and contacts the left sides of the first and second front panels 5*a* and 5*b*. A controller 8 is connected to the thermal printer. The controller 8 has a ten-key pad, which an operator operates to input data to be printed by the thermal printer.

The case 1 contains a printing mechanism 11. This mechanism will be descried in detail with reference to FIGS. 2 to 4.

Figure 4:
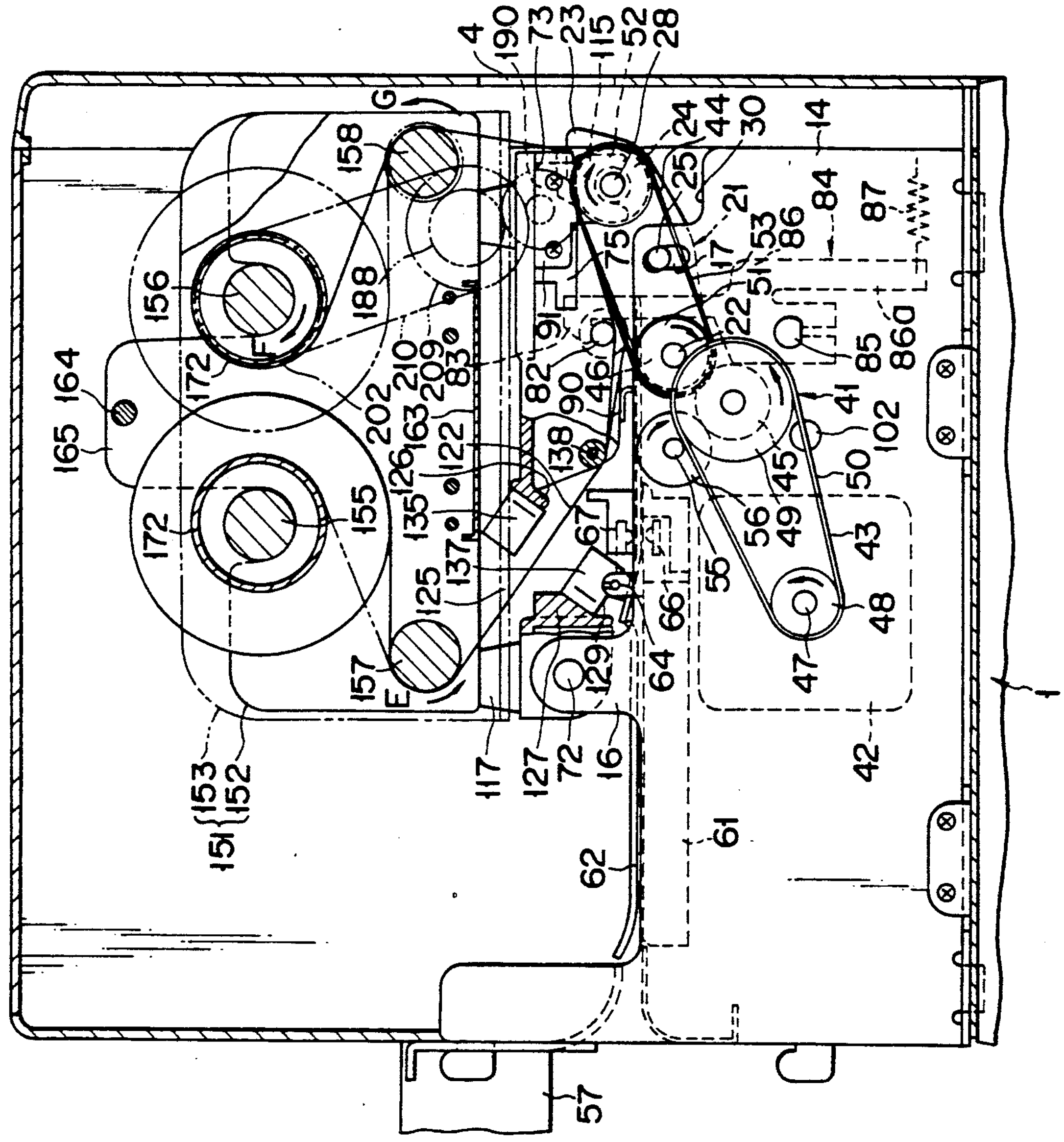

As FIGS. 2 to 4 show, the printing mechanism 11 comprises a frame 12 serving as a support body. The frame 12 is formed of a flat bottom plate 13 secured onto the upper surface of the base 2 of the case 1, and two side plates 14 and 15 connected by the bottom plate 13, extend upward, and opposing each other. Two supporting projections 16 protrude upward from the upper-middle portions of the side plates 14 and 15, respectively, and oppose each other. The side plates 14 and 15 have each an elongated guide hole 17 bored in the upper portion, located in front of the projection 16, and extending vertically. These guide holes 17 also oppose each other.

The printing mechanism 11 has a platen unit 21. The unit 21 is arranged between the side plates 14 and 15, and rotatably supported thereby. The platen unit 21 comprises a support shaft 22, two support plates 23, a platen roller 24, an intermediate shaft 25, and a pressure-exerting spring 26 serving as pressing means.

More precisely, as is illustrated in FIGS. 2 to 5, the support shaft 22 is substantially horizontal and extends between the side plates 14 and 15. It is fixed at both ends to the plates 14 and 15, and cannot rotate. The support plates 23, which are parallel to each other, are flat and located beside the side plates 14 and 15, respectively. They have through holes made in their read end portions. The support shaft 22 extends through these holes, so that both support plates 23 can independently rotate around the shaft 22.

A bearing 27 having a through hole is attached to the front end portion of either support plate 23. The shaft 28 of the platen roller 24 has its axial end portions extending through the holes of the bearings. Hence, the platen roller 24 extends substantially horizontally between the support plates 23. The platen shaft 28 has two large-diameter portions 29 which protrude from the ends of the platen roller 24, respectively.

The side walls 14 and 15 of the frame 12 each have a U-shaped cutout 30, which is made in the front end portion. The U-shaped cutouts 30 prevent the platen shaft 28, which is, like support shaft 22, longer than the distance between the side plates 14 and 15, from interfering with the side plates 14 and 15 of the frame 12.

The intermediate shaft 25 is located between the support shaft 22 and the platen roller 24, and extends horizontally between the side plates 14 and 15 of the frame 12. Both end portions of the shaft 25 extend passing through the support plates 23 to be rotatable relative to the plates 23, and are slidably inserted into the guide holes 17 of the side plates 14 and 15, respectively.

When the ends of the intermediate shaft 25 slide in the corresponding guide holes 17, both support plates 23 can rotate independently of each other, around the support shaft 22 by an angle corresponding to the distance for which the ends of the shaft 25 move. As the support plates 23 rotate, the platen roller 24 is moved between a contact position where it contacts a line thermal head 75 (descried later) and a separate position where it is spaced apart from the head 75.

The pressure-exerting spring 26 is, for example, a torsion spring wound around the middle portion of the support shaft 22. One end 31 of the spring 26, to which a force is applied, is hooked onto a pin 33 of a spring seat 32 which is fastened to the support shaft 22. The other end of the spring 26, which exerts a pressure on the platen roller 24, is hooked onto the middle portion of the intermediate shaft 25, more precisely at the position exactly half way between the support plates 23. Hence, the spring 26 exerts a pressure to the platen roller 24 through the intermediate shaft 25 and the support plates 23, biasing the platen roller 24 upward or toward the line thermal head 75.

As is shown in FIG. 3, the printing mechanism 11 has a final paper guide 35 for guiding a recording paper to the printing section or between the platen roller 24 and the line thermal head 75. The paper guide 35 is located above the platen unit 21 so that it prevents neither support plates 23 from moving.

As is illustrated in FIG. 2, a paper-feeding mechanism 41 is attached to the left side plate 14. As is evident from FIGS. 2 and 4, the paper-feeding mechanism 41 comprises an electric motor 42, a first belt-pulley transmission 43, a second belt-pulley transmission 44, a first transmission gear 45, and a second transmission gear 46.

The electric motor 42 is a stepping motor. It is secured to the inner surface of the side plate 14. Its drive shaft 47 passes through the plate 14 and protrudes outwards therefrom. The first belt-pulley transmission 43 is comprised of a pulley 48 fixed to the shaft 47 of the motor 42, a pulley 49 rotatably attached to the side plate 14, and an endless belt 50 wrapped around the pulleys 48 and 49. The second belt-pulley transmission 44 is comprised of a pulley 51 rotatably mounted on the left end of the support shaft 22 (FIG. 2), a pulley 52 fixed on the left end of the platen shaft 28 (FIG. 2), and an endless belt 53 wrapped around the pulleys 51 and 52. The pulley 49 is made of synthetic resin, and the first transmission gear 45 is integrally formed with this pulley 49. Similarly, the pulley 51 is made of synthetic resin, and the second transmission gear 46 is integrally formed with the pulley 51. The transmission gears 45 and 46 are meshed with each other.

When the drive shaft 47 of the electric motor 42 rotates counterclockwise (in FIG. 4), it drives the belt 50 of the first belt-pulley transmission 43 in the same direction, thus rotating the first transmission gear 45 in the same direction. The second transmission gear 46, in mesh with the gear 45, is therefore rotated clockwise as is shown in FIG. 4, driving the belt 53 of the second belt-pulley transmission 44 in the same direction. As a result, the pulley 52 is rotated clockwise, thereby rotating the platen roller 24 also clockwise as is shown in FIG. 4. As the platen roller 24 rotates so, it feeds a paper sheet forward.

A paper-feeding roller 54 extends horizontally between the side plates 14 and 15 and is located close the rear portion of the platen unit 21. The shaft 55 of the roller 54 is rotatably supported at both ends by the side plates 14 and 15, respectively. A gear 56 is fixed to that end portion of the roller shaft 55 supported by the side plate 14. This gear 56 is in mesh with the first transmission gear 45. Hence, as the shaft of the electric motor 42 rotates counterclockwise (in FIG. 4), the paper-feeding roller 54 is rotated clockwise (in FIG. 4).

As is illustrated in FIGS. 3 and 4, an inlet paper guide 61 is arranged at the rear of the paper-feeding roller 54 and extends almost horizontally between the side plates 14 and 15. A paper guide 62 is located above the guide 61 and spaced apart therefrom. The paper guide 62 can be expanded or contracted in the direction parallel to the axis of the paper-feeding roller 54, so that its width can be adjusted to that of the sheets of paper used. Further, an intermediate paper guide 63 is arranged above the paper-feeding roller 54, with its rear end located continuous to the front end of the paper guide 62, its front end located above the rear end portion of the final paper guide 35, and its middle portion set in contact with the paper-feeding roller 54. The rear end portion of the guide 63 is hinged to a support rod 64. Hence, the guide 63 can rotate around the axis of this support rod 64. The intermediate paper guide 63 is made of a metal plate.

As is shown in FIGS. 1 and 3, a roll holder 57 is attached to the rear wall of the case 1. The roll holder 57 holds a roll 58 of heat-sensitive paper as a recording medium. The heat-sensitive paper fed out of the roll 58 is guided into the case 1 through an inlet slit 6 formed in the rear wall of the case. Within the case 1, it passes through the gap between the guides 61 and 62 and is guided between the paper-feeding roller 54 and the intermediate paper guide 63. As the roller 54 is rotated clockwise (in FIG. 4), the heat-sensitive paper is fed to the printing section, while being guided by the final paper guide 35.

As is shown in both FIG. 3 and FIG. 4, a light-emitting device 66 having a light-emitting diode (not shown) is located on the front end portion of the inlet paper guide 61, and a light-receiving device 67 having a photosensor (not shown) is mounted on the intermediate paper guide 63 to oppose the device 66. Hence, the devices 66 and 67 cooperate to detect the heat-sensitive paper passing between them.

Figure 7:
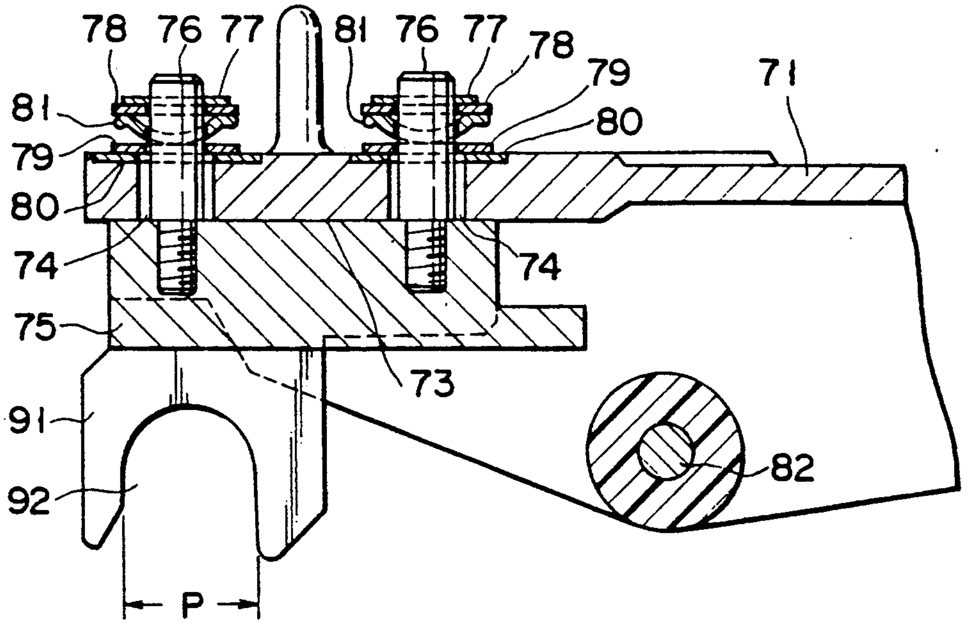

A head frame 71 is arranged above the platen unit 21. As is shown in FIG. 7, the frame 71 is a rectangular plate having both edges bent at right angle. Through hole are bored in the rear end portion of the frame 71. An axle 72 passes through the holes of the frame 71 and fastened at both ends to the projections 16 protruding from the side plates 14 and 15. Thus, the head frame 71 is supported by the axle 72 to be rotatable around it in the direction of an arrow B from a horizontal operating position illustrated in FIG. 3. As is shown in FIGS. 3 and 4, U-shaped leaf springs 90 are fastened to the lower surface of the head frame 71. As long as the frame 71 takes the operating position, the leaf springs 90 keep biasing the intermediate paper guide 63 downwards, pressing the guide 63 onto the paper-feeding roller 54.

Figure 6:
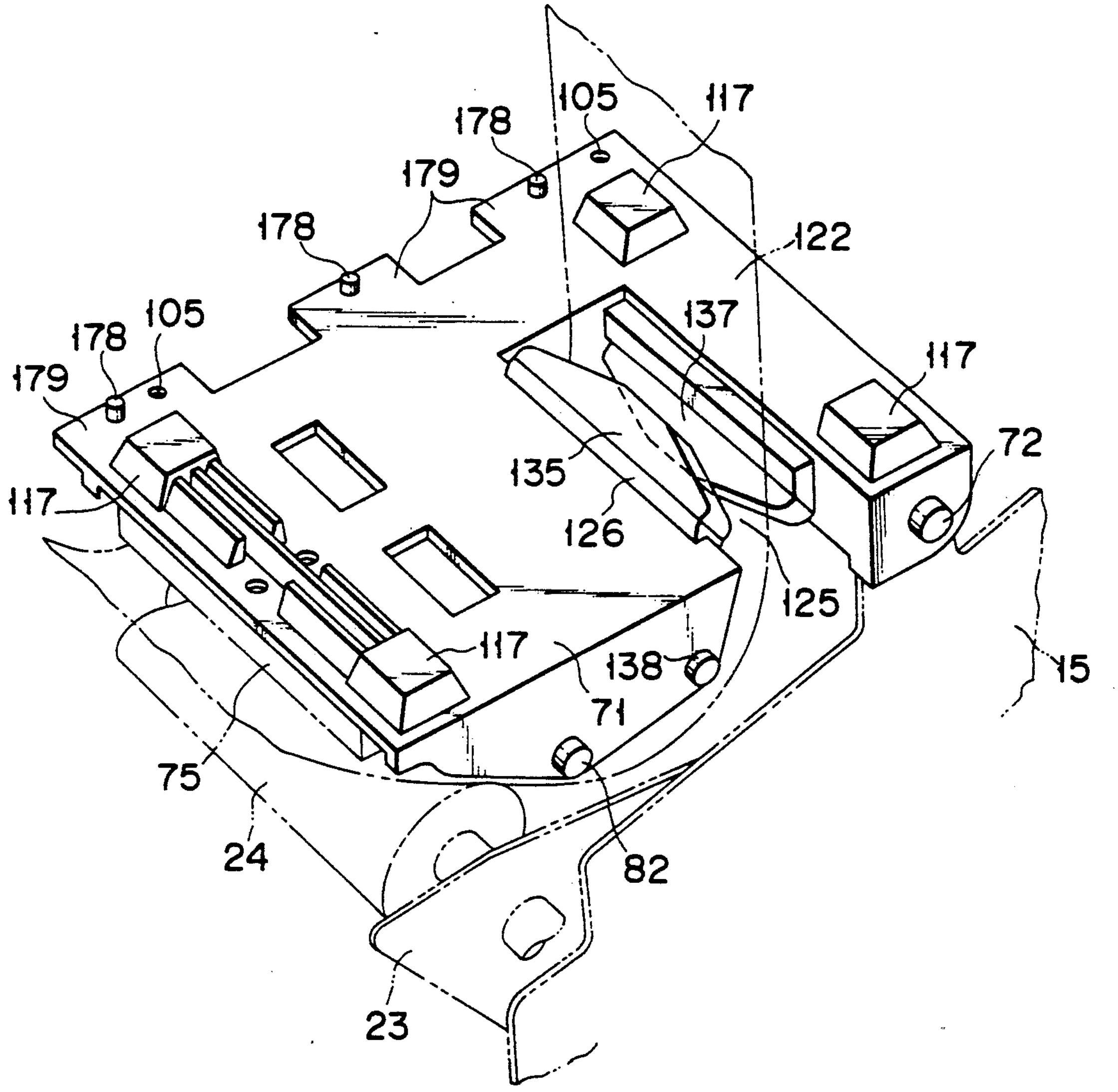

As is shown in FIGS. 6 and 7, the lower surface of the front portion of the head frame 7 constitutes a flat head mounting surface 73. The front portion of the frame 71 also has two through holes 74 open to the mounting surface 73. The holes 74 are set apart from each other in the axis of the head frame 71, and are located at the center in the axial direction of the platen roller 24. The through holes 74 are elongated in the axial direction of the head frame 71. Nonetheless, they can be round holes or elliptical holes.

The line thermal head 75 is attached to the flat mounting surface 73 of the head frame 71. The head 75 is thin and rectangular, and arranged so that its longitudinal axis extends parallel to the axis of the platen roller 24. While the head frame 71 is held in the operating position (FIG. 3), the line thermal head 75 contacts the platen roller 24. When the frame 71 is rotated in the direction of the arrow B (FIG. 3), the head 75 is moved away from the platen roller 24.

Figure 5:
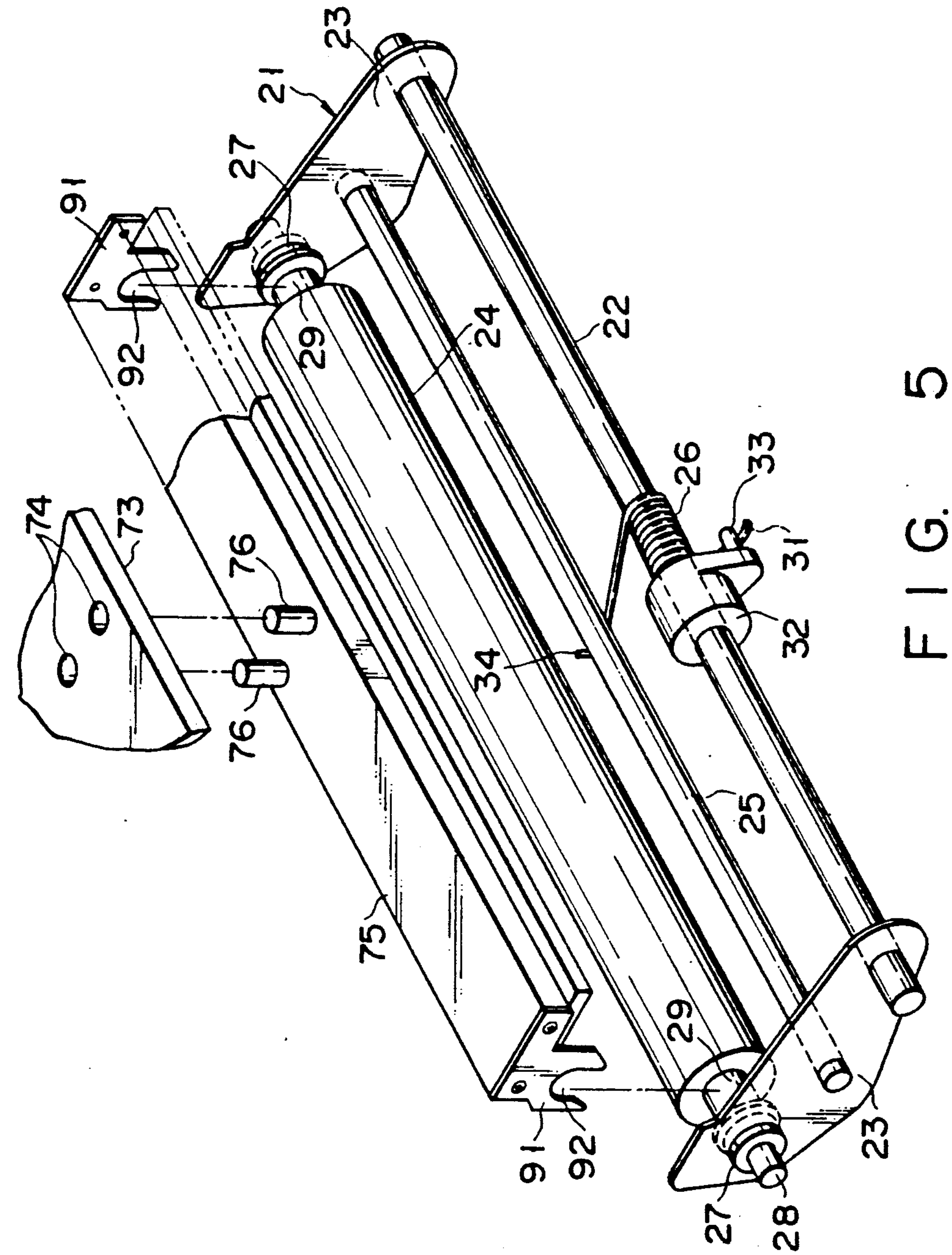

The line thermal head 75 can move a little horizontally with respect to the head frame 71, while held in contact with the mounting surface 73 of the frame 71. Specifically, as shown in FIGS. 5 and 7, the thermal head 75 is provided at its central portion with two connecting pins 76, which project upward therefrom and pass through the holes 74 of the head frame. The pins 76 have a diameter less than that of the holes 74, and thus, the thermal head 75 can move with respect to the frame 71 for a distance equal to the clearance between either pin 76 and the edge of the through hole 74 in which the pin 76 is loosely inserted. Either connecting pin 76 has its lower end set in screw engagement with the head 75 and its upper end protruding from the upper surface of the head frame 71. A stop ring 77 is fastened to the top of the pin 76. Three flat washers 78, 79 and 80 and one waved washer 81 are loosely fitted on the pin 76 and located between the upper surface of the frame 71 and the stop ring 77, such that the waved washer 81 is interposed between the flat washers 78 and 79.

By virtue of its spring force the waved washer 81 pushes the washer 78 onto the stop ring 77 and the washers 79 and 80 onto the upper surface of the frame 71, thereby holding the head 75 in contact with the flat mounting surface of the frame 71. The wave washers 81 can be replaced by any other biasing member.

Figure 8:
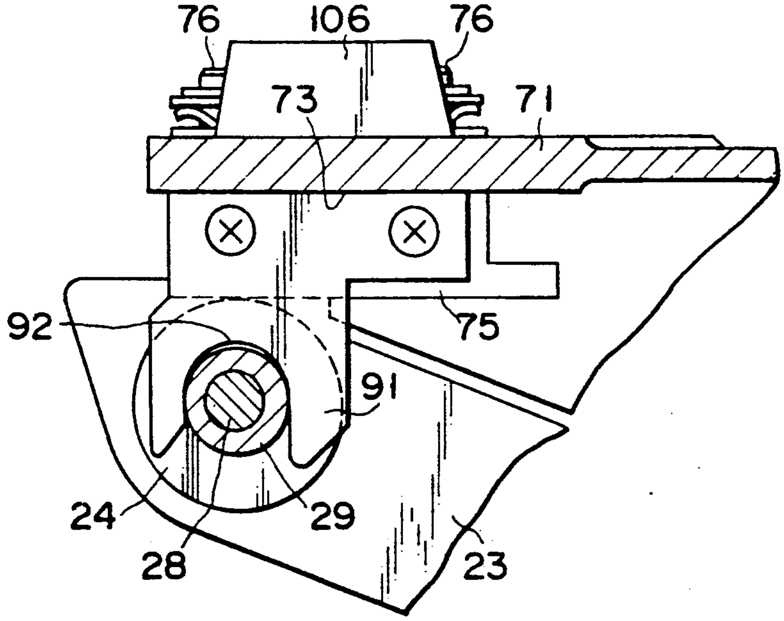

As is illustrated in FIGS. 5, 7 and 8, two U-shaped positioning plates 91 are fastened to the axial ends of the head 75, respectively, by means of screws. These plates 91 extends downwards, and have a U-notch 92 each. The U-notch 92 slightly diverges downwards, so that the large-diameter portion 29 of the platen shaft 28 may easily be fitted into the notch 92. The width P of either U-notch 92 is substantially the same as the diameter of the large-diameter portion 29 of the platen shaft 28.

Figure 9:
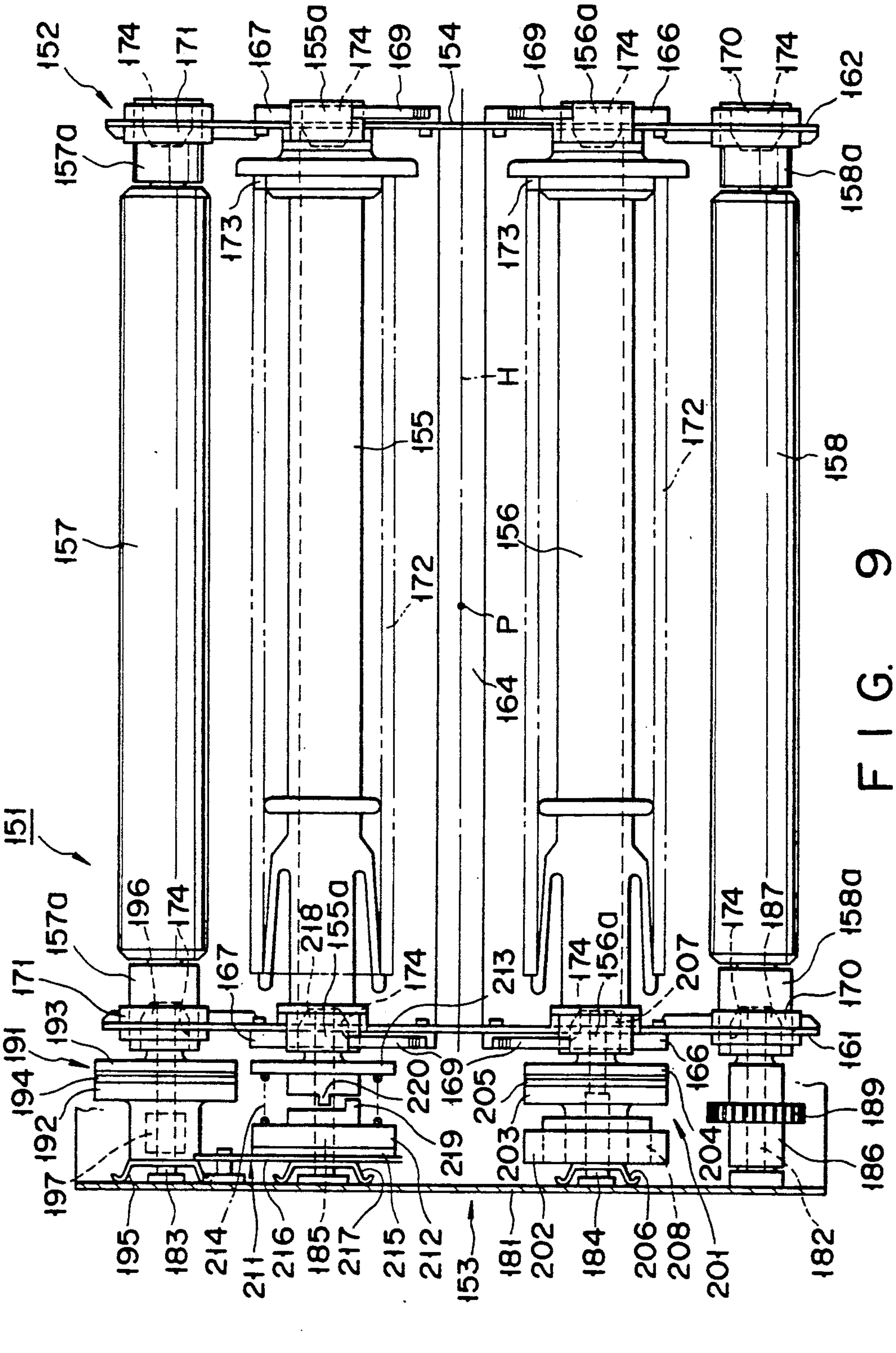
Figure 10:
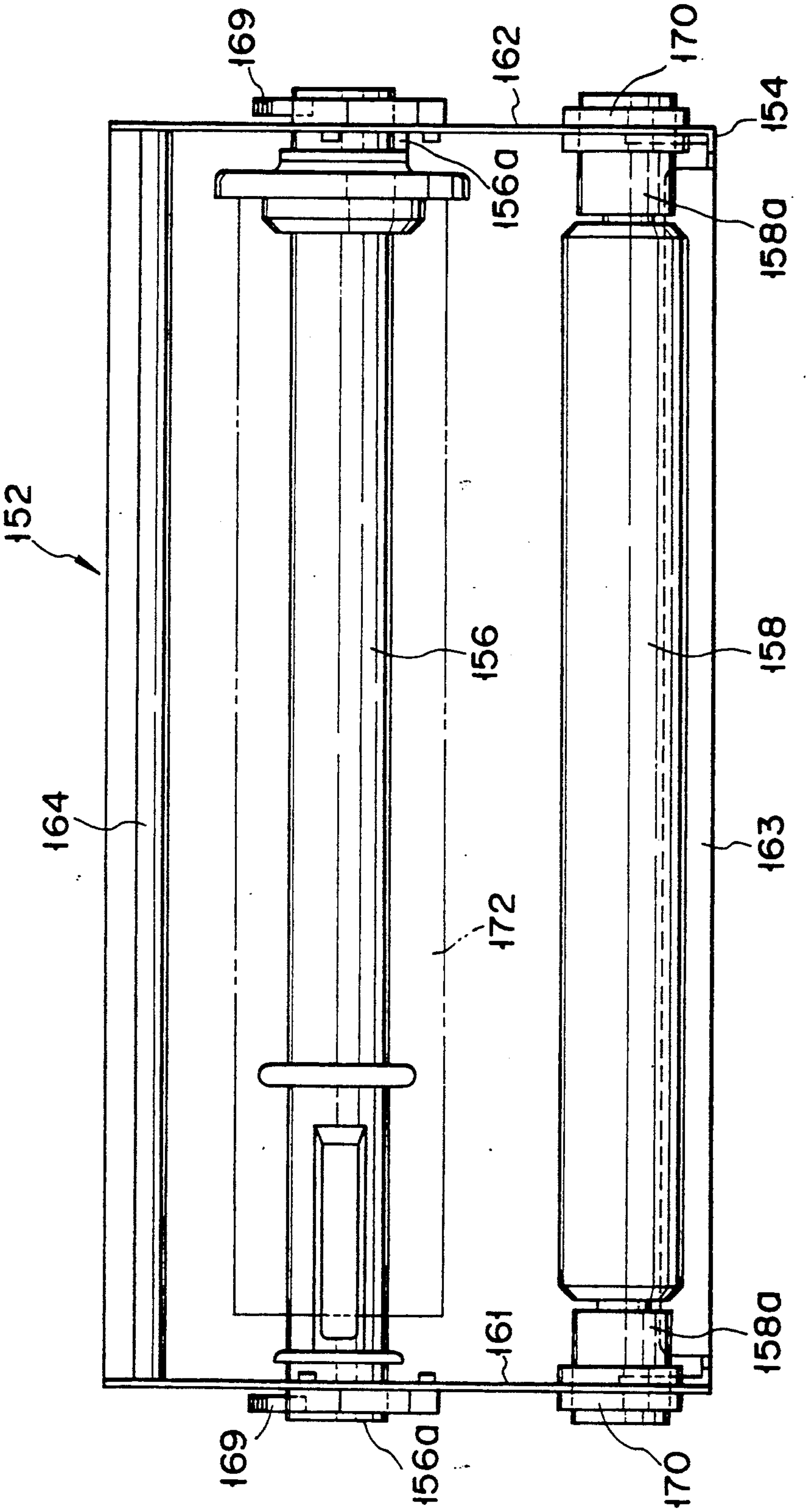
Figure 11:
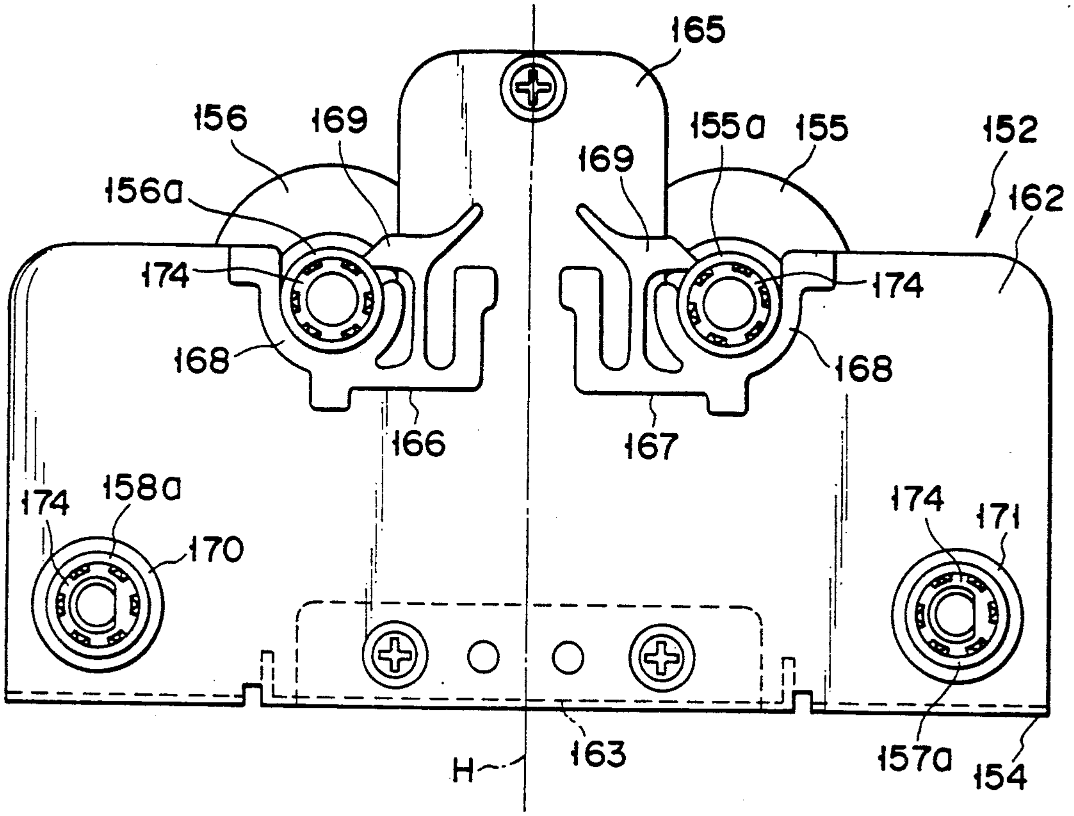
Figure 12:
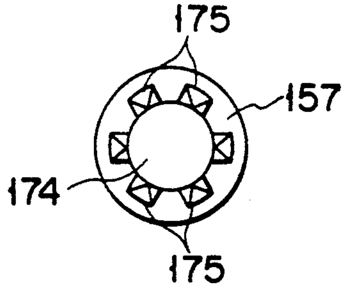

As shown in FIGS. 2 to 4, a ribbon supply device 151 is removably mounted on the top of the head frame 71. The ribbon supply device 151 includes a ribbon unit 152 and a ribbon drive section 153 to which the ribbon unit 152 is detachably connected, as shown in FIG. 9.

The ribbon unit 152 is mounted on bases 117 (see FIG. 6) as unit holding means, which are formed at the four corners on the upper surface of the head frame 71. The structure of the unit 152 will be described in detail.

As shown in FIGS. 3 and 9 to 11, the unit 152 includes a ribbon supporting frame 154, a supply shaft 155 as a first rotary shaft, a take-up shaft 156 as a second rotary shaft, a tension shaft 157, and a ribbon drive shaft 158. The ribbon supporting frame 154 is composed of side plates 161 and 162 opposing each other, a bottom plate 163 connecting the bottom portions of the side plates, and an upper lateral member 164 connecting projections 165 formed on the top center of the side plates 161 and 162. The upper lateral member 164 is formed of a columnar rod which is used as a handle for carrying the ribbon unit 152.

At the upper portions of the side plates 161 and 162, first upper bearings 166 are provided to oppose each other and located on the front of the projections 165, respectively. At the upper portions of the side plates 161 and 162, second upper bearings 167 are provided to oppose each other and located in the rear of the projections 165, respectively. Moreover, bearings 170 are provided at the bottom front portions of the side plates 161 and 162 to oppose each other, and bearings 171 are provided at the bottom rear portions of the plates 161 and 162 to oppose each other.

The bearings 166 and 167 are made of synthetic resin, and each bearing includes a bearing portion 168 having a recess open to the upper edge of the side plate, and a hook 169, serving as elastic holding means, arranged close to the top of the bearing portion 168. The base portion of the hook 169 is formed of a flexible thin wall. By elastic deformation of the base portion, the hook 169 extends toward the inside of the recess of the bearing portion 168 from the above thereof.

The supply shaft 155 is rotatably supported at its both axial ends 155*a* by the second upper bearings 167 and extends horizontally between the side plates 161 and 162. The supply shaft 155 is removable from the bearings 167. Specifically, the hook 169 elastically contacts the upper circumference of each axial end 155*a* of the supply shaft 155, which is supported with being fitted into the recess of the bearing portion 168. Therefore, the supply shaft 155 is prevented from unexpectedly removing out of the bearings 167. The supply shaft 155 can be removed upward from the bearings 167 by elastically deforming the hook 169 so as to separate it from the upper circumference of the axial end 155*a* of the supply shaft 155.

Also the take-up shaft 156 is rotatably supported at it both axial ends 156*a* by the first upper bearings 166 located at the front of the head frame 71, and extends horizontally between the side plates 161 and 162 in parallel with the supply shaft 155. The take-up shaft 156 can also be removed from the bearings 166. The removing procedure is omitted because it is the same as that for the supply shaft 155 described above.

The take-up shaft 156 formed in the same size and shape as that of the supply shaft 155. Therefore, the take-up shaft 156 and the supply shaft 155 are mounted on the ribbon supporting frame 154 so that they can be remounted on either of two sets of the front and rear bearings 166 and 167 according to the above-mentioned removing procedure.

The supply shaft 155 and the take-up shaft 156 are arranged symmetrically about an imaginary plane H (see FIGS. 9 and 11) which extends through the longitudinal center of the ribbon unit 152, that is, extends between the supply and take-up shafts 155 and 156 and between the ribbon drive and tension shafts 158 and 157 and is perpendicular to the bottom plate 163 of the supporting frame 154. Similarly, the bearings 166 and the bearings 167 are arranged symmetrically about the imaginary plane H.

On each of the supply and take-up shafts 155 and 156 is removably and coaxially fitted a core 172 formed of a cylinder, on which a transfer ribbon 122 is to be wound. These cores 172 are prevented from rotating relative to the supply and take-up shafts 155 and 156, respectively, by fitting a notch (not shown) formed at one end of each core to a protrusion 173 formed at one end of the corresponding shaft. The transfer ribbon 122 is wound on the core 172 fitted on the supply shaft 155. The ribbon 122 is to be drawn from the core and wound-up around the core on the take-up shaft 156 through the tension shaft 157 and ribbon drive shaft 158. The transfer ribbon 122 passes through a notch 125 (see FIGS. 4 and 6) formed in the head frame and the printing section having the platen roller 24 and line thermal head 75, when it travels between the tension shaft 157 and the ribbon drive shaft 158.

The ribbon drive shaft 158 is rotatably supported at it both axial ends 158*a* by the bearings 170 and extends between the side plates 161 and 162 in parallel with the take-up shaft 156. Therefore, the drive shaft 158 is located at the front of the head frame 71 and mounted between the printing section and the take-up shaft 156. The transfer ribbon 122 running from the printing section to the take-up shaft 156 is wound on the circumference of the ribbon drive shaft 158. The circumference of the drive shaft 158 is formed of the material (e.g. rubber) capable of obtaining large friction force against the transfer ribbon 122.

The tension shaft 157 is rotatably supported at its both axial ends 157*a* by the bearings 171 and extends between the side plates 161 and 162 in parallel with the drive shaft 158. Therefore, the tension shaft 157 is located at the rear of the head frame 71, between the printing section and the supply shaft 155. The transfer ribbon 122 running from the supply shaft 155 to the printing section is wound on the circumference of the tension shaft 157. Thus, the circumference of the tension shaft 157 is formed of the material (e.g. rubber) capable of obtaining large friction force against the ribbon 122.

The tension shaft 157 has the same size and shape as that of the ribbon drive shaft 158. Moreover, the tension shaft 157 and the ribbon drive shaft 158 are positioned symmetrically about the imaginary plane H, and also two sets of the front and rear bearings 170 and 171 are symmetrical about the imaginary plane H. Therefore, four shafts 155 through 158 rotatably supported on the ribbon supporting frame 154 are arranged at the positions which are symmetric to the imaginary plane H.

Figure 17:
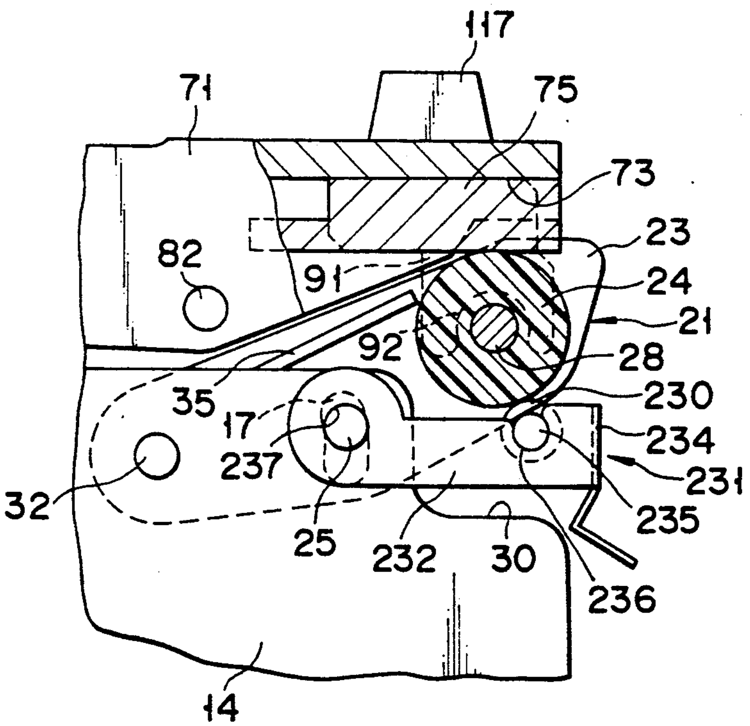

Each of the axial ends 155*a* through 158*a* has an engagement hole 174. The hole 174, as typically shown with respect to the shaft end 157*a* in FIG. 17, is formed coaxially with the shaft end, and a plurality of, for example, six grooves 175 extending in the axial of the shaft are formed in the inner circumferential surface of the hole 174 at the equal intervals.

The following describes the ribbon drive section 153 with reference to FIGS. 2, 9, 13 and 14.

The drive section 153 has a substantially rectangular base plate 181 located opposing the side plate 161 of the ribbon supporting frame 154. The base plate 181 has walls 181*a* extending from the top and bottom edges and the front and rear edges of the plate toward the ribbon supporting frame 154. The base plate 181 is removably mounted on the head frame 71 by screwing the bottom wall 181*a* to the upper surface of that end of the head frame 71 which is located close to the side plate 14. Specifically, as shown in FIG. 6, the head frame 71 is integrally provided with a flat seat 179 protruding from its one end to the side and continuous with the upper surface of the head frame. Cylindrical positioning pins 178 are installed at three places on the supper surface of the seat 179 one each, and apart from each other in the longitudinal direction of the head frame. A pair of tapped holes 105 is formed in the seat 179. Meanwhile, the bottom wall 181*a* of the base plate 181 is provided with three fitting-holes 177 corresponding to the positioning pins 178, and two through-holes 176 facing the corresponding tapped holes 105. Then the base plate 181 is positioned at a predetermined position on the head frame 71 by fitting the positioning pins 178 into the corresponding fitting holes 177. Under the above condition, the base plate 181 is secured to the head frame 71 by screwing the screws 177*a* into the tapped holes 105 through the through-holes 176, respectively.

The positioning pins 178 and fitting-holes 177 constitutes means for positioning the ribbon drive section 153 to the head frame, and the tapped holes 105 and screws 177*a* constitutes means for removably fixing the drive section to the head frame.

First through fourth supporting shafts 182 through 185 are horizontally and protrusively mounted on the base plate 181. The supporting shafts 182 through 185 are arranged correspondingly to the positions of the shafts 155 through 158 of the ribbon unit 152, respectively.

A drive shaft 186 is rotatably supported on the supporting shaft 182 mounted at the bottom front of the base plate 181. On the end of the drive shaft 186 is formed a power transmitting portion 187 which is detachably fitted into the engagement hole 174 of the ribbon drive shaft 158. A gear train 188 is mounted on the base plate 181. A final gear 189 of the gear train 188 is integrated with the drive shaft 186. The drive shaft 186 and the gear train 188 constitute a first drive section. An input gear 190 of the gear train 188 is arranged so that it engages a power transmitting gear 115 fixed to the platen shaft 28 when the head frame 71 is located at the operating position. Therefore, the take-up shaft 156, ribbon drive shaft 158, and the like of the ribbon supply device 152 are rotated in interlock with the operation of the paper-feeding mechanism 41. Thus, the device 151 shares the motor 42 of the feeding mechanism 41, as its power source.

A second loading mechanism 191 having a sliding clutch structure is mounted on the supporting shaft 183 arranged at the bottom rear of the base plate 181. The mechanism 191 includes a pressing-side loading member 192, a pressed-side loading member 193, a friction plate 194, and a pressure spring 195. The loading members 192 and 193 and the friction plate 194 are rotatably supported on the supporting shaft 183. The friction plate 194 is fixed to the pressing-side loading member 192 and located between the loading members 192 and 193. The pressure spring 195 presses the pressing-side loading member 192 against the pressed-side loading member 193. A power transmitting portion 196 is formed on the loading member 193 and detachably fitted to the engagement hole 174 of the tension shaft 157.

A one-way clutch 197 is arranged between the pressing-side loading member 192 and the supporting shaft 183. Only when the transfer ribbon 122 is being drawn from the supply shaft 155, the clutch 197 is brought under "ON" state and prevents the tension shaft 157 from rotating in the direction of arrow E in FIG. 4. Except in the above case, the clutch 197 is turned to "OFF" state and allows the tension shaft 157 to rotate in a direction opposite to the direction of arrow E.

A clutch mechanism 201 and a pulley 202 which constitute a second drive section are mounted on the supporting shaft 184 arranged at the upper front of the base plate 181. The clutch mechanism 201 has the same configuration as the second loading mechanism 191, which comprises a pressing-side loading member 203, a pressed-side loading member 204, a friction plate 205, and a pressure spring 206. The loading members 203 and 204 and a friction plate 205 are rotatably supported o the supporting shaft 184. The friction plate 205 is fixed to the pressing-side loading member 203 and mounted between the loading members 203 and 204. The pressure spring 206 presses the loading member 203 against the loading member 204. A power transmitting portion 207 is formed on the pressed-side loading member 204 and detachably fitted to the engagement hole 71 of the take-up shaft 156.

Figure 13:
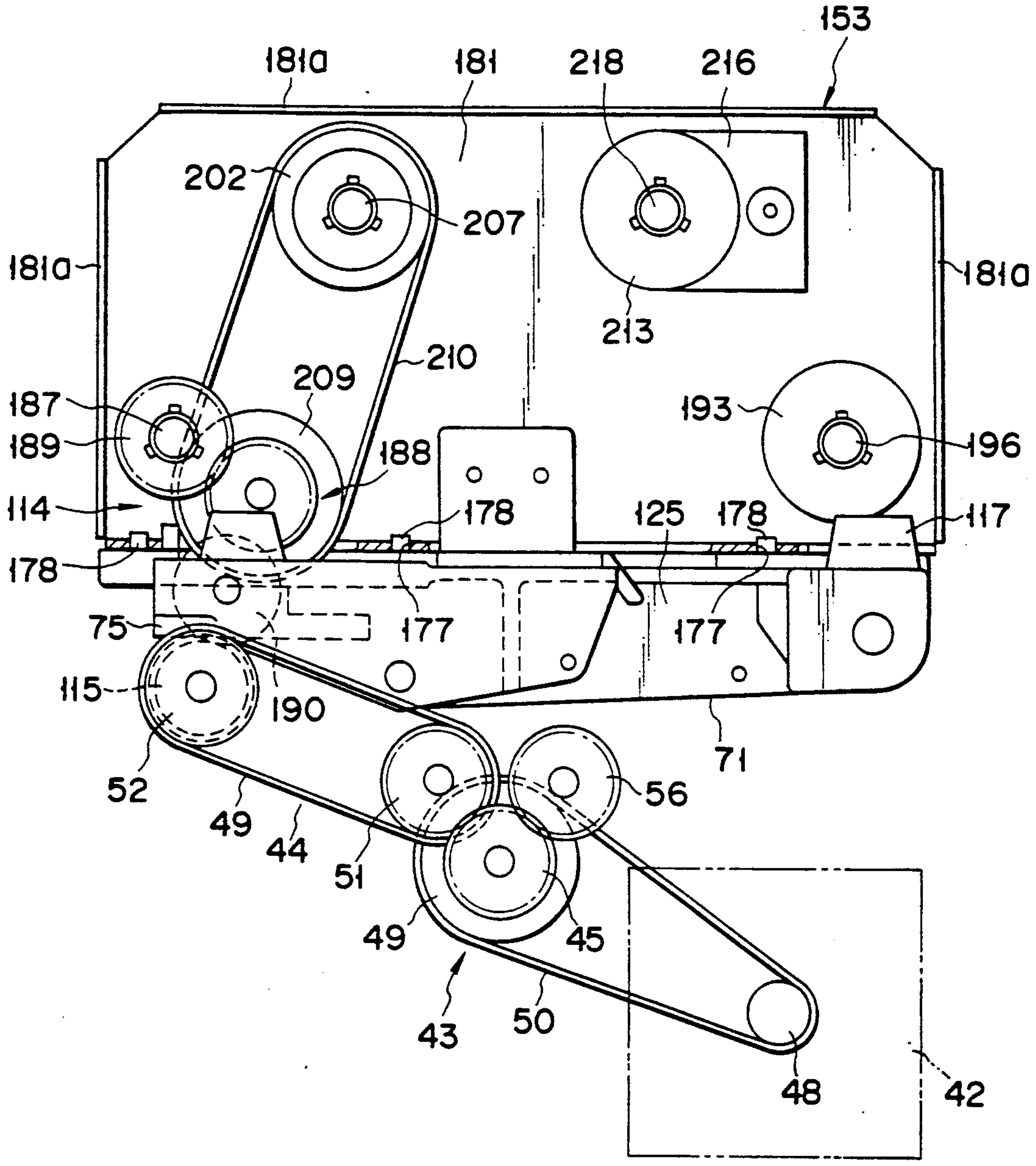
Figure 14:
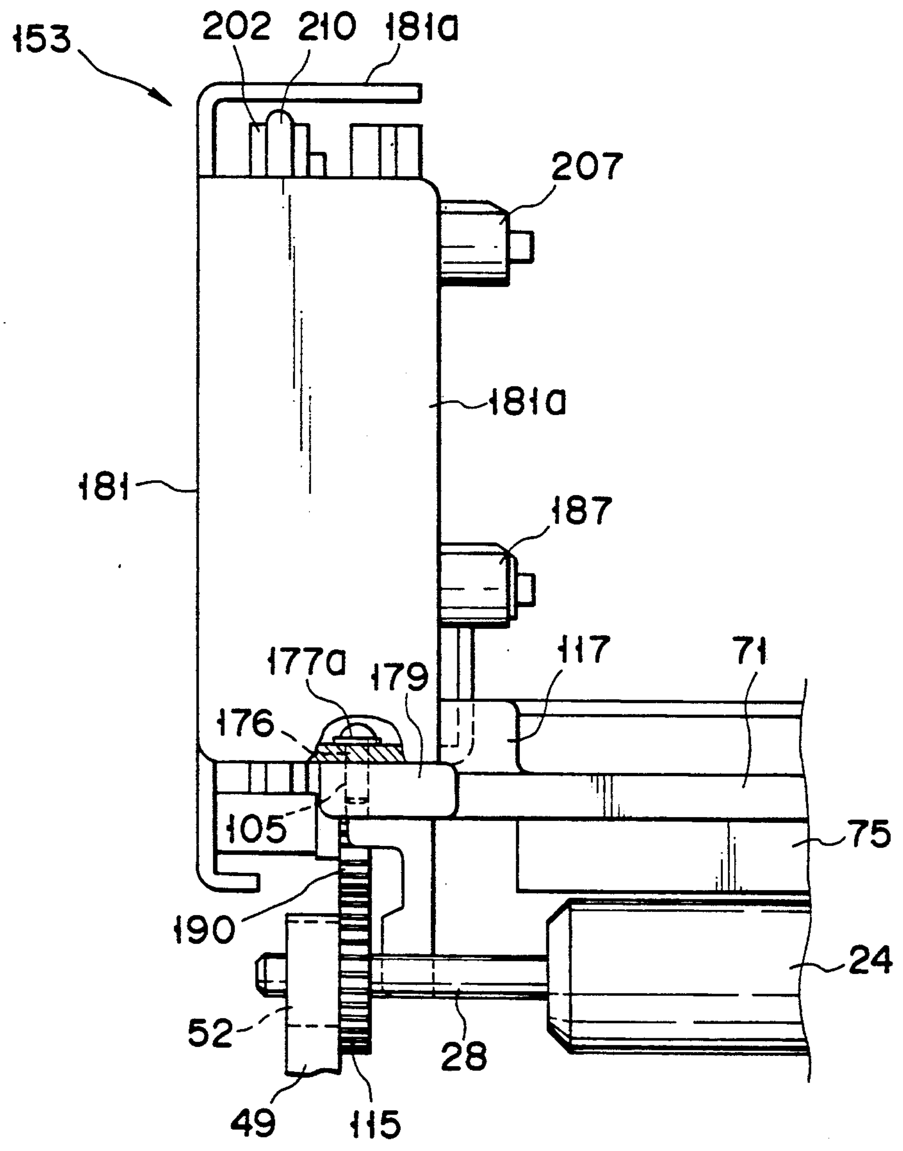

The pulley 202 is mounted on the outer periphery of the pressed-side loading member 203. As shown in FIG. 13, a power transmitting belt 210 is wrapped around the pulley 202 and a pulley 209 provided in the gear train 188. Thus, the pulley 202 is rotated in the direction same as the ribbon drive shaft 158 by the belt 210. A one-way clutch 208 is arranged between the pulley 202 and the pressing-side loading member 203. Only when the ribbon 122 is being taken-up on the take-up shaft 156, the clutch 208 is brought under "ON" state and allows the take-up shaft 156 to rotate in the direction of arrow F in FIG. 4. Except in the above case, the clutch 208 is turned to "OFF" state. The clutch mechanism 201 is designed such that the friction force generated between the pressed-side loading member 204 and the friction plate 205 is smaller than that generated between the ribbon drive shaft 158 and the transfer ribbon 122. The friction force to be generated can be adjusted by using a spring with a proper force for the pressure spring 206.

A first loading mechanism 211 is mounted on the supporting shaft 185 arranged at the upper rear of the base plate 181. The mechanism 211 comprises a pressing-side loading member 212, a pressed-side loading member 213, a torsion spring 214, a friction plate 215, a fixing plate 216, and a pressure spring 217. The loading members 212 and 213 are rotatably supported on the supporting shaft 185. The fixing plate 216 is formed of a metal plate and the supporting shaft 185 extends through the fixing plate. The friction plate 215 is arranged between the fixing plate 216 and the pressing-side loading member 212, and fixed to the fixing plate 216. The spring 214 is set between the loading members 212 and 213 by fixing the ends of the spring to the members, respectively. The spring 214 is formed of a coil spring and is coiled in such a direction that it is fastened and applies with back tension to the supply shaft 155 when the supply shaft 155 is rotated in the delivery direction. The pressure spring 217 presses the pressing-side loading member 212 against the pressed-side loading member 212 through the fixing plate 216 and friction plate 215. A power transmitting portion 218 detachably fitted to the engagement hole 174 of the supply shaft 155 is formed on the pressed-side loading member 213. Hooking protrusions 219 and 220 are are formed on that surfaces of the loading members 212 and 213 which oppose to each other, respectively. The protrusions 219 and 220 are mounted face to face and hooked with each other according to the rotation of the supply shaft 155. The rotational resistance applied the supply shaft 155 by the first loading mechanism 211 is set smaller than that to the tension shaft 157 by the second loading mechanism 191. The rotational resistance by the first loading mechanism 211 can be adjusted by using springs with a proper force for the pressure springs 195 and 197, respectively.

Figure 15:
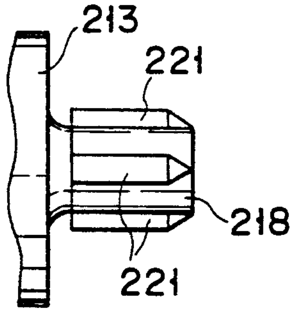
Figure 16:
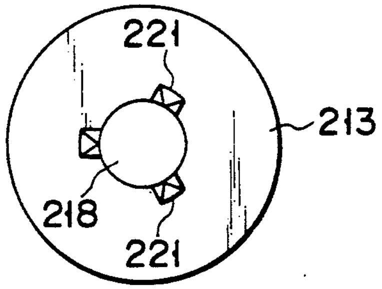

The configuration of the power transmitting portions 187, 196, 207, and 218 is typically shown by that of the power transmitting portion 218 in FIGS. 15 and 16. That is, each portion is formed in a cylindrical shape and has three projections 221 on the outer circumference thereof. The protrusions 221 of each portion engage the grooves 175 of the corresponding engagement hole 174, thereby performing power transmission between the transmitting portion and the corresponding shaft on the ribbon unit 151.

As shown in FIGS. 4 and 6, the notch 125 of the head frame 71 is located on the rear side of the printing section. The notch 125 is formed to extend in the width direction of the frame 71 from one side (side which is exposed by removing the removable side plate of the body frame 1) of the frame toward the other side thereof. A sensor bracket 126 is arranged on the frame 71 along the front end of the notch 125 and extends diagonally upward form the frame. Similarly, a sensor bracket 127 is arranged on the frame 71 along the rear end of the notch 125 and extends diagonally downward therefrom. On the sensor bracket 126 is provided a first ribbon sensor 135 containing a photodetector formed of a photoelectric element. On the sensor bracket 127 is mounted a second ribbon sensor 137 containing a projector formed of a light emitting diode. The photodetector and projector are arranged to oppose each other, thereby detecting the ribbon end and presence of a ribbon.

Guide shafts 82 and 138 are rotatably mounted between side walls of the head frame 71 and located between the notch 125 and the printing section. These shafts 82 and 138 guide the travel of the transfer ribbon 122 from the notch 125 to the printing section. Both ends of the guide shaft 82 extend through the side walls of the head frame 71 and protrude to the side of it, respectively, thereby constituting claw receivers of a holding mechanism 84 described latter. A pair of claws of the holding mechanism 84 are detachably hooked to the claw receivers, whereby the head frame 71 is locked at the operating position and the line thermal head 75 is held at an printing position where it contacts the platen roller 24.

To be more specific, as is shown in FIGS. 2 and 3, the holding mechanism 84 comprises a rotary shaft 85, a pair of hooks 86, and a pair of coil springs 87. The shaft 85 extends parallel to the guide shaft 82, and is rotatably supported, at both ends, by the side plates 14 and 15. The hooks 86 are fixed to the shaft 85 and located adjacent to the side plates 14 and 15, respectively. Hence, they rotate when the shaft 85 rotates. Either hook 86 has a projection which extends upward from the shaft 85 and is provided at the top with the claw 83 engageable with the claw receiver formed. The hook 86 also has an arm 86a which extends downwards, and the coil spring 87 or compression spring is stretched between the arm 86a and the side plate (14 or 15). Thus, the hook 86 is biased to rotate counterclockwise (in FIG. 3) about the shaft 85, by means of the coil spring 87. Hence, the claw 83 is set in engagement with the claw receiver of the guide shaft 82, whereby the head frame 71 is locked in the operating position.

Either claw 83 of the hooks 86 has a slope 83a on which the guide shaft 82 slides when the head frame 71 is rotated downward from its non-operating position to the operating position. Hence, when the frame 71 is rotated downward to the operating position, the shaft 82 rotates the hook 86 clockwise against the biasing force of the coil spring 87. When the head frame 71 reaches the operating position, the coil spring 87 rotates the hook 86 counterclockwise, whereby the claw 83 automatically goes into engagement with the claw receiver of the guide shaft 82. As a result of this, the head frame 71 is locked in the operating position. At this time, the claws 83 keep into engagement with the claw receivers of the shaft 82 by virtue of only the force of the coil spring 87, but also the force of the pressure-exerting spring 26 which has been transmitted to the head frame 71 through the platen roller 24 and the line thermal head 75. In other words, both springs 26 and 87 serve to lock the head frame 71 in the operating position. The bias of the spring 26 is greater than the total weight of the head frame 71 and the ribbon supply device 151.

When an excessive load is applied downward on the head frame 71 after the frame 71 has been set in the operating position, the front-lower edge of the frame 71 abuts on both side plates 14 and 15. The head frame 71 is thereby prevented from further moving downwards.

As is shown in FIG. 3, the right side plate 15 has a through hole 88. The hook 86, which opposes the side plate 15, has a release lever 89 which is formed by bending a portion of the hook. The lever 89 passes through the hole 88 of the side plate 15 and protrudes outwardly. As the release lever 89 contacts the circumference of the through hole 88, the rotation of both hooks 86 is restricted. The release lever 89 is exposed when the side panel 3 is removed from the case 1, so that an operator can have an access to the lever 89. When the operator rotates the release lever 89 downward or clockwise (in FIG. 3), both claws 83 of the frame-holding mechanism 84 are released from the ends of the guide shaft 82. As result, the head frame 71 is unlocked and allowed to rotate upward from the operating position.

As is illustrated in FIGS. 2 and 3, the thermal printer further comprises a platen-moving mechanism 110 designed to move the platen roller 24 away from the line thermal head 75, so that a recording paper can be fed faster than otherwise. This mechanism 110 comprises a gear box 95 fastened to the side plate 15 and containing a reduction gear mechanism 96. The mechanism 96 has a plurality of gears. Of these gears, the output gear 97 is fastened to a shaft 102. The shaft 102 extends parallel to the support shaft 22 and the shaft 85 and is rotatably supported at both ends by the side plates 14 and 15. In the gear box 95 is contained a drive motor 98 or a pulse motor.

A cam 99 is mounted on the middle portion of the shaft 102. A cam follower 100, shaped like a lever, is rotatably mounted on the middle portion of the shaft 22 of the platen unit 21. The rear end portion of the cam follower 100 rests upon the cam 99. The front end portion of the cam follower 100 rests on the intermediate shaft 25. The right end portion of the shaft 102 passes through a hole made in the side plate 15 and extends outwards therefrom. An operation lever 101 is coupled to the right end of the shaft 8.

The platen-moving mechanism 110 is operated to feed the recording paper fast in the case where no data needs to be printed in a relatively large portion of the paper. The mechanism 110 is operated in the manner described below.

First, the pulse motor 98 is driven, thus rotating the shaft 102 and, hence, the cam 99, both in the direction of the arrow B in FIG. 3. The cam follower 100 is thereby rotated in the direction of an arrow C (FIG. 3) around the support shaft 22. The cam follower 100 pushes the intermediate shaft 25 downwards, whereby both support plates 23 also rotate in the direction of the arrow C around the shaft 22 or move down. As a result, the platen roller 24 is moved down, away from the line thermal head 75. The gap between the roller 24 and the head 75 increases, whereby the recording paper can be fed faster. The gap between the roller 24 and the head 75 can be increased to feed the paper faster, also by rotating the operation lever 101, thereby rotating the shaft 102 in the direction of the arrow B (FIG. 3).

In the case where the ribbon supply device is used for performing the transfer thermal printing, it is not only when there is no need to print data on a large portion of the paper, but also when the paper is fed for a one-line distance, that the pulse motor 98 is driven, thus moving the platen roller 24 away from the head 75 to feed the paper faster. While the paper is fed for the one-line distance, the platen roller 24 thus remains spaced apart from the head 75 and the transmitting gear 115 is disengaged from the input gear 190. Therefore, the ink ribbon is not fed at all though the paper-feeding is continued. Hence, the ribbon can be prevented from unnecessary consumption and is not wasted.

Moreover, according to this embodiment, a separation roller 230 is removably mounted on the front end portions of the side plates 14 and 15, as shown in FIG. 17. The separation roller 230 contacts the platen roller 24 from the lower side thereof, and is selectively used to separate printed labels from the belt-shaped base paper. The roller 230 is supported by the side plates 14 and 15 through a bracket 231. The bracket 231 is formed of a metal plate and includes a pair of right and left mounting arms 232 located at the outside of the side plates 14 and 15, and a band-shaped connecting plate 234 connecting these arms. At the upper edge of each arm 232 is formed a groove 236 rotatably supporting the roller shaft 235 of the separation roller 230. In the rear ends of the arms 232 are formed fitting holes into which both ends of the intermediate shaft 25 of the platen unit 21 are fitted, respectively. The intermediate shaft 25 is firmly fitted to the holes 237 so that the mounting arms 232 do not rotate relative to the shaft 25.

Therefore, the separation roller 230, along with the platen roller 24, is biased upward by pressure spring 26 of the platen unit 21 (see FIG. 3) and rotatably contacts the lower surface of the platen roller 24. By leading the base paper of the label sheet delivered between the platen roller 24 and the line thermal head 75 to between the separation roller 230 and the platen roller 24, the base paper is approximately U-turned immediately after passing the platen roller 24, so that the label on the base paper can naturally be separated therefrom. In this case, for more smooth separation of the label, it is preferable that the bracket 231 is provided with a separation guide extending to the front of the platen roller 24 so as to sharply fold the base paper at the position immediately after the platen roller.

In the thermal printer having the above arrangement, a transfer ribbon 122 is set in the printer while the side panel 3 of the case 1 is removed, as in the following manner.

First, the operation lever 89 of the holding mechanism 84 is pushed downwards so as to rotate the hooks 86 and disengage the pawls 83 from the ends of the guide shaft 82, thereby releasing the lock of the head frame 71. Then, the head frame 71 is rotate in the direction of arrow B to the non-operating position shown by two dots and dashed line in FIG. 3. Secondly, the ribbon drive section 153 of the ribbon supply device 15 is attached on the head frame 71. Specifically, the lower wall 181*a* of the base plate 181 is mounted on the seat 179 of the head frame 71. In this case, the pins 178 on the seat 179 are fitted into the respective fitting holes 177 of the wall 181*a*, thereby positioning the drive section 153 with the head frame 71. Thereafter, the drive section 153 is fastened at a predetermined position on the head frame 71 by screwing the screws 177*a* into the corresponding tapped holes 105 through the through-holes 176.

After mounting of the drive section 153 is completed, the transfer ribbon 122 is set to the ribbon supporting frame 154 of the ribbon unit 152 and the unit is mounted on the bases 117 of the head frame 71. Then, the supply shaft 155, tension shaft 157, take-up shaft 156, and ribbon drive shaft 158 of the ribbon unit 152 are fitted to the power transmitting portions 207, 187, 218, and 196, respectively, thereby coupling the ribbon unit 152 with the drive section 153. Under this condition, as shown in FIG. 3, that portion of the transfer ribbon 122, located between the tension shaft 153 and the ribbon drive shaft 158 is drawn downward, and the drawn portion is inserted into the space between the platen roller 24 and the line thermal head 75 from the side and into the notch 125 of the head frame 71 from its open side.

Then, the label sheet as a recording medium drawn from the roller holder 57 is introduced between the inlet guides 61 and 62, and further introduced below the ribbon 122 at the position between the platen roller 24 and the line thermal head 75 which are spaced away from each other, via the paper-feeding roller 54 and final paper guide 35. Thereafter, the head frame 71 is rotated downward to the operation position, whereby the line thermal head 75 contacts the platen roller 24 while the label paper and transfer ribbon 122 are being held between them. At the same time, the ends of the guide shaft 82 are hooked to the pawls 83 of the hooks 86 and the head frame 71 is locked at the operating position. Also the input gear 190 of the ribbon drive section 153 is engaged with the power transmitting gear 115 on the platen roller 24 side, so that the drive section 153 is ready to be driven by the drive motor 42 of the paper-feeding mechanism 41.

Then, the operation lever 101 is actuated to open the printing section, thereby making the transfer ribbon 122 free. In this state, by rotating the take-up shaft 156 by hand to wind the extra transfer ribbon 122 on the shaft, the transfer ribbon 122 is tensed with being in contact with the guide shafts 82 and 138.

Finally, the operation lever 101 is released. Thus, as shown in FIG. 4, the transfer ribbon 122 and label sheet are clamped between the platen roller 24 and the thermal head 75, and the setting of the transfer ribbon and label sheet is completed.

In the state where the transfer ribbon 122 is set in the above-mentioned manner, that portion of the ribbon which is located between the supply shaft 155 and the take-up shaft 156 passes through between the platen roller 24 and the thermal head 75 while overlapping with the label sheet. Accordingly, by energizing the thermal head 75, ink on the transfer ribbon 122 is transferred to the label sheet to print information thereon.

The following is the description of the operation of the ribbon system 151 when the label printer operates.

When the platen roller 24 rotates according to the operation of the paper-feeding mechanism 41, the drive shaft 186 is rotated through the gear trains 188 and 189. At the same time, the pressing-side loading member 203 of the clutch system 201 is rotated through the pulleys 209 and 202 and the power transmitting belt 210. Since the ribbon drive shaft 158 is connected to the drive shaft 186, the shaft 158 rotates in the direction on arrow G in FIG. 4 and feeds the transfer ribbon 122 contacting the circumference of the shaft 158. In this case, the one-way clutch 208 between the pressing-side loading member 203 and the pulley 202 is brought under "ON" state, so that the loading member 203 is rotated. The rotation of the member 203 is transmitted to the take-up shaft 156 through the loading members 203 and 204, which are pressed against each other by the pressure spring 206, and the friction plate 205. Therefore, the take-up shaft 156 rotates in the direction of arrow F in FIG. 4 to take-up the transfer ribbon 122 passed through the ribbon drive shaft 158.

In winding the ribbon 122, if the winding force of the take-up shaft 156 becomes equal to or more than the friction force generated between the ribbon drive shaft 158 and the transfer ribbon 122 contacting the shaft, the pressed-side loading member 204 of the clutch system 201 slips on the friction plate 205. Thus, the clutch system 201 is turned to "OFF" state and the transmission of the winding force to the take-up shaft 156 is interrupted. Therefore, change in the ribbon winding force is not affected to the printing section. Moreover, for the relationship between the ribbon drive shaft 158 and the transfer ribbon 122, the moving force of the ribbon 122 does not change. Therefore, the winding force acting on the transfer ribbon 122 passing through the printing section can be kept constant even though the diameter of the roll of the transfer ribbon 122 wound on the take-up shaft 156 changes. Thus, the transfer ribbon 122 is prevented from being extremely tensed at the beginning of ribbon winding, and it is prevented that the transfer ribbon is extremely firmly wound, the ribbon is disconnected, and smudge or sticking occurs.

In this embodiment, as shown in FIG. 4, the transfer ribbon 122 is wound on take-up shaft 156 starting with the position of the shaft 156, close to the supply shaft 155. This type of winding starting with the inside makes it possible to increase the contact area of the transfer ribbon 122 with respect to ribbon drive shaft 158 as the diameter of the ribbon roll increases or as the winding force decreases. Therefore, the ribbon 122 is securely fed toward the take-up shaft 156 by the ribbon drive shaft 158, without slipping on the shaft 158.

The transfer ribbon 122 running by the winding operation tends to rotate the tension shaft 157. However, the second loading mechanism 191 is connected to the tension shaft 157 and its one-way clutch 197 is under "ON" state. Therefore, the free rotation of the tension shaft 157 is restricted by the friction force generated between the friction plate 194 and the pressed-side loading member 193. Thus, only when a torque larger than the friction force is applied to the tension shaft 157 by the transfer ribbon 122, the shaft 157 is rotated while slipping between the friction plate 194 and the pressed-side loading member 193. As the result, generally, back tension is applied to the transfer ribbon 122.

At the same time, upon of winding the ribbon 122, the supply shaft 155 is supplied with a torque through the ribbon 122, and the ribbon 122 is drawn from the supply shaft 155. The pressed-side loading member 213 of the first loading mechanism 211 is rotated together with the supply shaft 155. Since the member 213 is rotated against the biasing force of the torsion spring 214, the supply shaft 155 is applied with back tension through the loading member 213 by the biasing force of the spring 214. When the pressed-side loading member 213 is rotated by a certain angle, the hooking protrusion 220 engages the hooking protrusion 219 of the pressing-side loading member 212, thereby rotating the loading member 212. The friction plate 215 is set between the loading member 212 and the fixing plate 216 and the friction force generated therebetween restricts the rotation of the supply shaft 156. Accordingly, back tension is applied to the transfer ribbon 122.

The back tension given to the transfer ribbon 122 by the first loading mechanism 211 is adjusted to be smaller than the back tension provided by the second loading mechanism 191. Thus, the back tension acting on the transfer ribbon 122 between the tension shaft 157 and the printing section is kept constant regardless of the change in the diameter of the ribbon roll on the take-up shaft 155. Moreover, the tension shaft 157 always applies with a constant back tension the transfer ribbon 122 by the action of the second loading mechanism 191, as mentioned above.

Thus, the moving force for winding the transfer ribbon 122 running through the printing section can be kept constant regardless of the change in the diameter of the ribbon roll on the take-up shaft 156. Therefore, it is possible to decrease the frequency of the generation of creases and sticking in the transfer ribbon 122 at the end of winding. By running the transfer ribbon 122 in the above manner, disconnection of the ribbon and occurrence of sticking and creases can be prevented, thereby improving the printing quality. Moreover, since the transfer ribbon 122 is wound with a substantially constant winding force, it can be prevented from being firmly or loosely wound, thus further reducing the generation of creases in the ribbon.

Therefore, once-used transfer ribbon 122 can be effectively reused In this case, the first rotary shaft (supply shaft 155) from which the transfer ribbon 122 is completely drawn and the second rotary shaft (take-up shaft 156) on which the ribbon 122 is completely taken-up are from the ribbon supporting frame 154, and then, the removed first and second shafts, along with the ribbon, are remounted on the front bearings 166 and the rear bearings 167, respectively. Thus, the remounted shafts 155 and 156 will function as a take-up shaft and a supply shaft, respectively, in the following printing. The shaft removing and remounting operations are performed while elastically deforming the roots of the hooks 169 to the outside the bearings 166 and 177, as previously mentioned.

Figure 18:
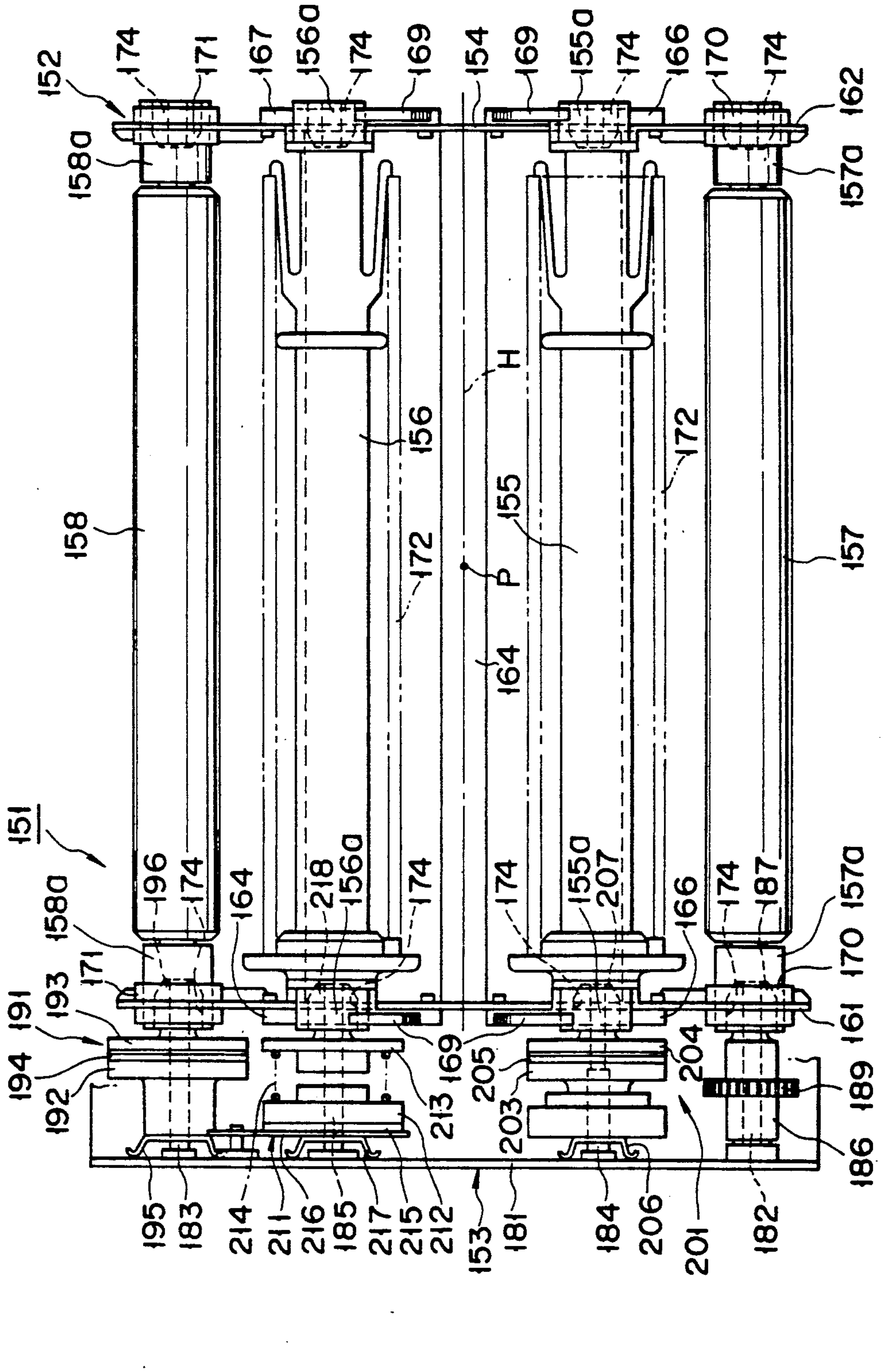

Since the ribbon unit 152 is constructed to be symmetrical with respect to the imaginary plane H, reuse of the transfer ribbon 122 can be executed according to the following simple operation instead of the above operation to replace the first and second rotary shafts. Specifically, first, the unit 152 is removed from the head frame 71 and is turned by 180 degrees about the center shaft P located in the imaginary plane H and extending perpendicularly to each shaft. Then, the turned unit 152 is reset on the head frame 71 and connected to the ribbon drive section 153. Upon resetting the ribbon unit 152 the engagement holes 174 formed in the axial ends 155*a* through 158*a* of the shafts 155 through 158 are respectively engaged with the power transmitting portions 187, 196, 207, and 218 of the ribbon drive section 153 which face the corresponding engagement holes. Thus, the several protrusions 221 of each power transmitting portion are fitted into the several grooves 175 of the corresponding engagement hole 174, thereby realizing power transmission from the ribbon drive section 153 to the shafts 155 through 158 of the ribbon unit 152. Therefore, the ribbon unit 152 can be easily connected to the ribbon drive section 153 without troublesome operation By remounting the ribbon unit 152 after turning it through 180 degrees, it is possible to use the first rotary shaft (supply shaft 155), from which the transfer ribbon 122 is completely drawn, and the second rotary shaft (take-up shaft 156), on which transfer ribbon 122 is completely wound, as a take-up shaft and a supply shaft, respectively. At the same time, the rotary shaft used as the tension shaft 157 is brought to the front of the head frame 71 and set as a ribbon drive shaft. In contrast, the rotary shaft used as the ribbon drive shaft 158 is brought to the rear of the head frame 71 and set as a tension shaft. FIG. 18 shows the remounted ribbon unit 152.

According to the above procedure, the once-used transfer ribbon 122 can be easily reused. In this case, since the whole ribbon unit is turned, it is unnecessary to touch the transfer ribbon 122. Thus, setting can be easily performed as compared with the case of replacing the first and second rotary shafts each other in position.

Meanwhile, for the direct-thermal printing using labels made of heat-sensitive paper, the transfer ribbon 122 is unnecessary. Therefore, in this case, the lock of the head frame 71 is released by pressing the operation level 89 of the holding mechanism 84, and the head frame 71 is rotated upward so as to separate the platen roller 24 from the line thermal head 75. Then, that portion of the transfer ribbon 122, located between the tension shaft 157 and the ribbon drive shaft 158 is drawn from the gap between the platen roller 24 and the line thermal head 75 and also form the notch 125 of the head frame 71 to the side thereof. Consequently, the ribbon unit 152 is detached from the top of the head frame 71. After loosening the screws 177*a* securing the drive section 153 to the head frame 71, the section 153 is remove from the the head frame.

Under the above state, when the head frame 71 is rotated downward to the operating position, only the label sheet is held between the platen roller 24 and the thermal head 75. Thus, by heating the label on the sheet by the line thermal head 75, information can be directly printed on the label.

According to the printer with the above configuration, the ribbon supply device 151 necessary for performing the transfer-thermal printing is removably mounted on the head frame 71 as one unit. Therefore, in either the transfer-thermal printing or the direct-thermal printing, the components other than the ribbon supply device 151, such as not only the line thermal head 75 and platen roller 24 necessary for printing but also various systems at the side of the body case 1 including the paper-feeding mechanism 41, holding mechanism 86, and platen-moving mechanism 110 can be directly used as the common component section. Only in the transfer-thermal printing, the ribbon supply device 151 is prepared and fastened on the bases 179 of the head frame 71 by screws. Therefore, it is unnecessary to always provide the expensive ribbon supply device 151 on the printer, thereby reducing the cost of the printer.

Further, with the printer, by rotating the head frame 71 to its operating position, the input gear 190 of the ribbon supply device 151 is in mesh with the power transmitting gear 115 which rotates integral with the platen roller 24, so that the take-up shaft 155, ribbon drive shaft 157, and the like of the device 151 can be driven by the paper-feeding mechanism 41. Therefore, no exclusive motor is necessary to wind the transfer ribbon 122 because the ribbon can be run from the supply shaft 156 to the take-up shaft 155 by using the drive force of the motor 42 in the paper-feeding mechanism 41. Thus, number of parts, the cost, and weight of the ribbon supply device can be reduced.

In the above embodiment, the separation roller 230 for peeling the printed labels from the band-shaped bas paper is rotatably supported by bracket 231, which is also supported on the side plates 14 and 16 while the axial ends of the intermediate shaft 25 projecting from the side plates are fitted in the fitting holes 237 in the bracket 231, respectively. Therefore, the separation roller 230 can be easily removed from and attached to the side plates, if necessary. In addition, since it is unnecessary to provide the printer with a special structure for mounting the separation roller 230 on the side plates 14 and 15, the printer can be used in either case where the separation roller 230 is required or not.

According to the printer in this embodiment, the platen roller 24 is pressed against the line thermal head 75 supported on the head frame 71 while the platen unit 21 rotatable about the supporting shaft 22 mounted between two side plates 14 and 15 is biased toward the head frame 71 by the pressure spring 26 mounted on the supporting shaft 22. The support plates 23 of the platen unit 21 can rotate about the supporting shaft 22, independently of each other. In accordance with the rotation of the support plates 23, the both axial ends of the platen roller 24 can move relative to the thermal head 75, independently of each other. Therefore, even if the platen roller 24 is positioned not parallel to the line thermal head 75, the position the platen roller 24 can be automatically adjusted so that the platen roller will not unevenly contact the line thermal head 75, merely by rotating one or both of the support plates 23 properly. Further, by fitting the positioning plates 91 to the platen shaft 28, the thermal head 75 is slightly moved and automatically adjusted in it position so that the longitudinal axis of the head is in parallel with that of the platen roller 24. Accordingly, the printing quality of the printer can be greatly improved.

The present invention is not limited to the above-mentioned embodiment and various changes and modifications can be made within the scope of this invention.

Figure 19:
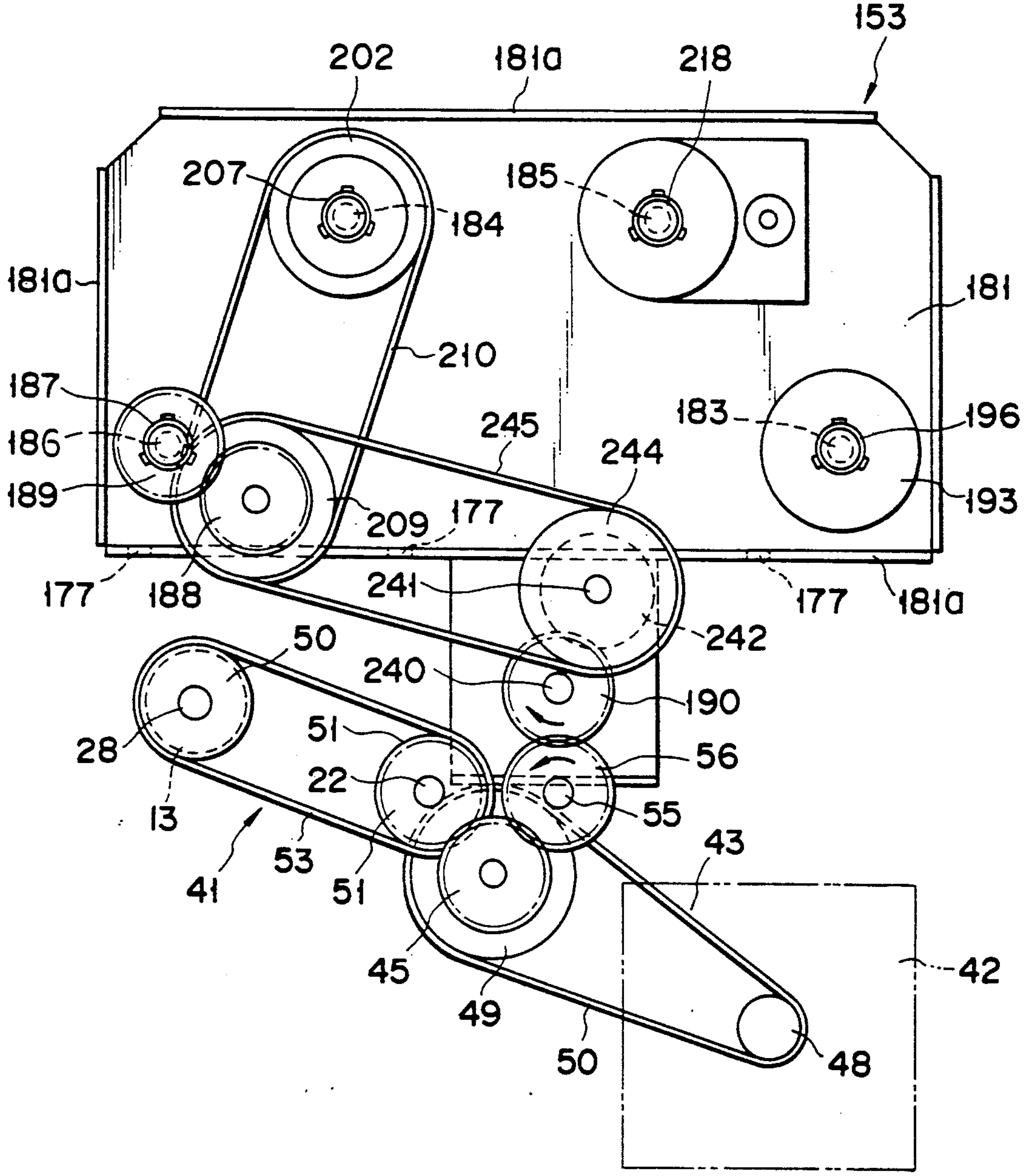
FIG. 19 is a side view schematically showing the connection state between the ribbon drive section and the paper-feeding mechanism in a thermal printer according to another embodiment of this invention.

For example, in the above embodiment, the input gear 190 of the ribbon supply device 151 is engaged with the power transmitting gear 115 rotating together with the platen roller 24. However, the power transmitting structure is not limited this embodiment and may be configured as shown in FIG. 19, for example. In FIG. 19, the same numbers as in the above embodiment are represented by the same reference numerals, and the detailed description thereof will be omitted.

In the embodiment shown in FIG. 19, an input gear 190 is rotatably mounted at the bottom center of the base plate 181 of the ribbon drive section 153 through a pivot 240. A driven gear 242 is rotatably mounted on the base plate 181 through a pivot 241 and located above the input gear 190. The driven gear 242 is in mesh with the input gear 190, and integrally provided with a pulley 244. A belt 245 is wrapped around the pulley 244 and the pulley 209 mounted on the intermediate gear 188. When the head frame 71 is rotated to the operating position, the input gear 190 engages with the interlocking gear 56 on the roller shaft 55.

As shown in FIG. 19, when the input gear 190 is rotated clockwise through the interlocking gear 56, the drive gear 189 and power transmitting portion 187 are also rotated clockwise through the pulleys 244 and 209, belt 245, and intermediate gear 188, and the pulley 202 and power transmitting portion 207 are rotated counterclockwise through the belt 210. Thus, the ribbon drive shaft 158 and take-up shaft 156 of the ribbon supply device 151 are rotated in the direction of winding the transfer ribbon 122.

Also in the second embodiment with the above configuration, the same advantage as that of the first embodiment previously mentioned can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A thermal printer comprising:

printing means having a printing head and a platen opposing the printing head, for printing information on a recording medium passing between the platen and printing head;

feeding means for feeding a recording medium between the platen and the printing head; and a ribbon supply device for running a transfer ribbon between the printing head and the recording medium;

said ribbon supply device including:

a ribbon unit having a ribbon supporting frame which includes a pair of first bearing portions opposing each other, and a pair of second bearing portions opposing each other, each of said first and second bearing portions having a recess with an opening to an outside of the supporting frame, and first and second rotary shafts rotatably supported by said supporting frame and having said transfer ribbon wound thereon, said first rotary shaft having a pair of axial ends rotatably fitted in respective recesses of said first bearing portions and being removable from such recesses through respective openings thereof, said second rotary shaft having a pair of axial ends rotatably fitted in respective recesses of said second bearing portions and being removable from such recesses through the respective openings thereof, said first and second rotary shafts being formed in same shape and size so that the first and second rotary shafts, along with the transfer ribbon, are adapted to be remounted on the ribbon supporting frame, and switched in position; and a ribbon drive means for rotating the second rotary shaft to take-up the transfer ribbon, drawn from the first rotary shaft, on the second rotary shaft through between the printing head and the recording medium.

2. A printer according to claim 1, wherein said printing means includes a head frame supporting said printing head, said ribbon unit and ribbon drive section are removably mounted on the head frame, respectively, and said ribbon unit is removably connected to the ribbon drive section.

3. A printer according to claim 2, which further comprises: means for positioning said ribbon drive section at a predetermined position on said head frame, means for removably fixing the ribbon drive section to the head frame, and means for holding the ribbon unit on the head frame while the ribbon unit is being connected to the ribbon drive section.

4. A printer according to claim 2, wherein said ribbon unit includes a tension shaft rotatably supported by the ribbon supporting frame and arranged to contact the transfer ribbon between the first rotary shaft and the printing means, and a ribbon drive shaft rotatably supported by the ribbon supporting frame and arranged to contact the transfer ribbon between the printing means and the second rotary shaft, said ribbon drive shaft being formed in the same shape and size as that of the tension shaft, and said ribbon drive shaft and the tension shaft being parallel to each other;

said ribbon drive section includes first through fourth supporting shafts arranged to be engageable with said ribbon drive shaft, tension shaft, and second and first rotary shafts, respectively; and said first rotary shaft and the tension shaft are arranged symmetrically to the second rotary shaft and the ribbon drive shaft, respectively, about an imaginary plane which extends between the first and second rotary shafts and between the tension and ribbon drive shafts in parallel with these shafts, so that the tension shaft, ribbon drive shaft, first rotary shaft, and second rotary shaft are adapted to be engaged with said first through fourth supporting shafts, respectively, when said ribbon supporting frame is connected to the ribbon drive section while reversing the ribbon supporting frame.

5. A printer according to claim 4, wherein each of said first, second, ribbon drive, and tension shafts includes a pair of axial ends, each axial end has an engagement hole having several grooves on an inner surface thereof and extending in the axial direction of the shaft, and each of said first through fourth supporting shafts has a power transmitting portion removably fitted into a corresponding engagement hole, each of said power transmitting portion having projections engaging the grooves of the corresponding engagement hole.

6. A printer according to claim 4, wherein said ribbon supply device includes interlocking means for transmitting a drive force of said feeding means to the ribbon drive section to operate the ribbon drive section in interlock with an operation of the feeding means.

7. A printer according to claim 6, wherein said head frame is arranged to be movable between an operating position where the printing head contacts the platen and a non-operating position where the printing head is spaced away from the platen, and said interlocking means has an input member engageable with the feeding means when the head frame is moved to the operating position.

8. A printer according to claim 6, wherein said ribbon drive section includes a first drive portion supported on the first supporting shaft and engage with the interlocking means, for rotating the ribbon drive shaft, and a second drive portion rotatably supported on the third supporting shaft, for rotating the second rotary shaft in interlock with the rotation of the first drive portion.

9. A printer according to claim 8, wherein said ribbon drive section includes a clutch mechanism arranged in the second drive portion, for disconnecting transmission of the rotation from the second drive portion to the second rotary shaft when force larger than the friction force between the ribbon drive shaft and the transfer ribbon is applied to the second rotary shaft.

10. A printer according to claim 4, wherein said ribbon drive section includes first loading means provided on the fourth supporting shaft, for applying to the first rotary shaft with rotational resistance, and second loading means provided on the second supporting shaft, for applying to the tension shaft with rotational resistance larger than the rotational resistance applied by the first loading means.

11. A printer according to claim 1, wherein said supporting frame includes a pair of opposed side plates, said first bearing portions are formed in the side plates, respectively, and said second bearing portions are formed in the side plates, respectively.

12. A printer according to claim 1, wherein said supporting frame includes holding means for elastically holding each of said axial ends of the first and second rotary shafts in the recess of its corresponding bearing portion.

13. A thermal printer comprising:

printing means having a printing head and a platen being in contact with the printing head, for printing information on a recording medium passing through between the platen and the printing head;

feeding means for feeding the recording medium through between the platen and the printing head; and a ribbon supply device for running a transfer ribbon through between the printing head and the recording medium;

said ribbon supply device including:

a ribbon unit having a ribbon supporting frame, a first rotary shaft which is rotatably supported by ribbon supporting frame and on which the transfer ribbon is wound, a second rotary shaft rotatably supported by the ribbon supporting frame, for taking-up the transfer ribbon drawn from the first rotary shaft and passed through between the printing head and the recording medium, said second rotary shaft being formed in the same shape and size as the first rotary shaft, a tension shaft rotatably supported by ribbon supporting frame and arranged to contact the transfer ribbon between the first rotary shaft and the printing means, and a ribbon drive shaft rotatably supported by the ribbon supporting frame and arranged to contact the transfer ribbon between the printing means and the second rotary shaft, said ribbon drive shaft being formed in the same shape and size as the tension shaft, and the first, second, ribbon drive, and tension shafts being being arranged in parallel to one another; and a ribbon drive section detachably connected to the ribbon unit, for rotating the second rotary shaft to take-up the transfer ribbon, passed through between the printing head and the recording medium, on the second rotary shaft, said ribbon drive section having first through fourth supporting shafts arranged to be engageable with the ribbon drive shaft, tension shaft, second rotary shaft, and first rotary shaft, respectively;

said first rotary shaft and the tension shaft being arranged symmetrically to the second rotary shaft and the ribbon drive shaft, respectively, about an imaginary plane which extends between the first and second rotary shafts and between the tension and ribbon drive shafts in parallel with these shafts, so that the tension shaft, ribbon drive shaft, first rotary shaft, and second rotary shaft are adapted to be engaged with said first through fourth supporting shafts, respectively, when said ribbon supporting frame is connected to the ribbon drive section while the ribbon supporting frame is being reversed.

14. A thermal printer comprising:

printing means having a printing head and a platen being in contact with the printing head, for printing information on a recording medium passing through between the platen and the printing head;

feeding means for feeding the recording medium through between the platen and the printing head; and a ribbon supply device for running a transfer ribbon through between the printing head and the recording medium;

said ribbon supply device including:

a ribbon unit having a ribbon supporting frame, a first rotary shaft which is rotatably supported by the ribbon supporting frame and on which the transfer ribbon is wound, a second rotary shaft rotatably supported by the ribbon supporting frame, for taking-up the transfer ribbon drawn from the first rotary shaft and passed through between the printing head and the recording medium, and a ribbon drive shaft rotatably supported by the ribbon supporting frame and arranged to contact the transfer ribbon between the printing means and the second rotary shaft; and a ribbon drive section for rotating the second rotary shaft to take-up the transfer ribbon, passed through between the printing head and the recording medium, on the second rotary shaft, said ribbon drive section having a clutch mechanism for disconnecting transmission of the rotational force to the second rotary shaft when rotational force larger than the friction force between the ribbon drive shaft and the transfer ribbon is applied to the second rotary shaft.

15. A thermal printer comprising:

printing means having a printing head and a platen being in contact with the printing head, for printing information on a recording medium passing through between the platen and the printing head;

feeding means for feeding the recording medium through between the platen and the printing head; and a ribbon supply device for running a transfer ribbon through between the printing head and the recording medium;

said ribbon supply device including:

a ribbon unit having a ribbon supporting frame, a first rotary shaft which is rotatably supported by the ribbon supporting frame and on which the transfer ribbon is wound, a second rotary shaft rotatably supported by the ribbon supporting frame, for taking-up the transfer ribbon drawn from the first rotary shaft and passed through between the printing head and the recording medium, a ribbon drive shaft rotatably supported by the ribbon supporting frame and arranged to contact the transfer ribbon between the printing means and the second rotary shaft, and a tension shaft rotatably supported by the ribbon supporting frame and arranged to contact the transfer ribbon between the first rotary shaft and the printing means; and a ribbon drive section for rotating the second rotary shaft to take-up the transfer ribbon, passed through between the printing head and the recording medium, on the second rotary shaft, said ribbon drive section having first loading means for applying to the first rotary shaft with rotational resistance, and second loading means for applying to the tension shaft with rotational resistance larger than the rotational resistance applied by the first loading means.

16. A thermal printer comprising:

printing means having a head frame supporting a printing head, and a platen opposing the printing head, for printing information on a recording medium running between the platen and the printing head;

means for feeding the recording medium passing between the platen and the printing head; and a ribbon supply device for running a transfer ribbon between the printing head and the recording medium;

said ribbon supply device including:

a ribbon unit having a ribbon supporting frame removably mounted on the head frame, and first and second rotary shafts rotatably supported by the ribbon supporting frame and having said transfer ribbon wound thereon; and a ribbon drive means for rotating the second rotary shaft to take-up the transfer ribbon, drawn from the first rotary shaft, onto the second rotary shaft as it passes between the printing head and the recording medium, said ribbon drive means being removably mounted on the head frame, and said ribbon unit being removably connected to the ribbon drive means.

17. A printer according to claim 16, wherein said ribbon supply device includes means for transmitting a drive force of said feeding means to the ribbon drive means to operate the ribbon drive means in interlock with an operation of the feeding means, said transmitting means having engaging means connected to the ribbon drive means for engaging the feeding means when the ribbon drive means is mounted on the head frame.

* * * * *

UNITED STATES PATENT AND TRADEMARK OFFICE
CERTIFICATE OF CORRECTION

PATENT NO. : 5,138,335

DATED : August 11, 1992

INVENTOR(S) : SUGIMOTO et al

It is certified that error appears in the above-identified patent and that said Letters Patent is hereby corrected as shown below:

Title page, item [56] References Cited, insert the following:

item [56]
Under U.S. PATENT DOCUMENTS -

4,797,690 1/1989 Takita et al........346/76PH item [56]
Under FOREIGN PATENT DOCUMENTS -

0,294,792 12/1988 EPA
58-24478 2/1983 Japan
62-16180 1/1987 Japan

Signed and Sealed this

Thirtieth Day of November, 1993

Attest:

BRUCE LEHMAN

*Attesting Officer*

*Commissioner of Patents and Trademarks*